(12) United States Patent
Li et al.

(10) Patent No.: US 9,965,957 B2
(45) Date of Patent: May 8, 2018

(54) DRIVING SUPPORT APPARATUS AND DRIVING SUPPORT METHOD

(71) Applicant: MITSUBISHI ELECTRIC CORPORATION, Tokyo (JP)

(72) Inventors: Haozhou Li, Tokyo (JP); Hitoshi Sawada, Tokyo (JP); Tsutomu Matsubara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days. days.

(21) Appl. No.: 15/529,952

(22) PCT Filed: Nov. 26, 2014

(86) PCT No.: PCT/JP2014/081194
§ 371 (c)(1),
(2) Date: May 25, 2017

(87) PCT Pub. No.: WO2016/084149
PCT Pub. Date: Jun. 2, 2016

(65) Prior Publication Data
US 2017/0330463 A1    Nov. 16, 2017

(51) Int. Cl.
*G08G 1/16* (2006.01)
*G06T 11/60* (2006.01)
*G06T 11/00* (2006.01)
*B60K 37/04* (2006.01)

(52) U.S. Cl.
CPC ............. *G08G 1/166* (2013.01); *B60K 37/04* (2013.01); *G06T 11/001* (2013.01); *G06T 11/60* (2013.01); *B60K 2350/106* (2013.01); *B60K 2350/2008* (2013.01); *B60K 2350/2013* (2013.01); *B60K 2350/901* (2013.01); *B60K 2350/965* (2013.01); *B60Y 2300/08* (2013.01); *B60Y 2400/303* (2013.01); *B60Y 2400/3015* (2013.01); *B60Y 2400/3017* (2013.01); *G06T 2210/62* (2013.01)

(58) Field of Classification Search
CPC .......... G08G 1/16; G08G 1/161; G08G 1/166; G08G 1/167; G01S 13/931; B60C 9/008; B60C 1/525; G01C 21/26; G06T 11/60; G06T 11/001; B60K 37/04
USPC ........ 340/903, 933, 936, 937, 435; 701/300, 701/301, 400, 538
See application file for complete search history.

(56) References Cited

U.S. PATENT DOCUMENTS

2007/0078601 A1    4/2007  Nakano et al.
2011/0293145 A1*  12/2011  Nogami ................ G08G 1/166
                                                           382/103
(Continued)

FOREIGN PATENT DOCUMENTS

DE           60207029 T2    7/2006
DE      602004011164 T2   12/2008
(Continued)

*Primary Examiner* — Thomas Mullen
(74) *Attorney, Agent, or Firm* — Birch, Stewart, Kolasch & Birch, LLP

(57) ABSTRACT

An image of the nearby surroundings of a user's vehicle is displayed, which includes images of the user's vehicle and threshold lines that define a range of distance from the user's vehicle. The image of the nearby surroundings of the user's vehicle is changed in accordance with a positional relationship between another vehicle and the range of distance.

15 Claims, 23 Drawing Sheets

(56) References Cited

U.S. PATENT DOCUMENTS

| | | | |
|---|---|---|---|
| 2012/0130561 A1* | 5/2012 | Chiang | G08G 1/165 701/1 |
| 2013/0090843 A1 | 4/2013 | Funabashi | |
| 2014/0067250 A1 | 3/2014 | Bone et al. | |
| 2014/0119597 A1* | 5/2014 | Sung | G06K 9/00805 382/103 |
| 2014/0203925 A1* | 7/2014 | Augst | G08G 1/16 340/435 |
| 2014/0244151 A1* | 8/2014 | Matsubara | G08G 1/165 701/301 |
| 2014/0257659 A1* | 9/2014 | Dariush | G08G 1/166 701/70 |
| 2014/0285364 A1* | 9/2014 | Chen | G08G 1/167 340/988 |
| 2016/0093215 A1* | 3/2016 | Kiefer | G08G 1/166 340/438 |

FOREIGN PATENT DOCUMENTS

| | | |
|---|---|---|
| DE | 102008013981 A1 | 9/2009 |
| DE | 102010049721 A1 | 4/2012 |
| JP | 2007-102577 A | 4/2007 |
| JP | 2008-15758 A | 1/2008 |
| JP | 2013-80422 A | 5/2013 |
| JP | 2013-168063 A | 8/2013 |
| WO | WO 2012/160590 A1 | 11/2012 |

\* cited by examiner

Normal-Sized Vehicle    Small-Sized Vehicle

Large-Sized Vehicle

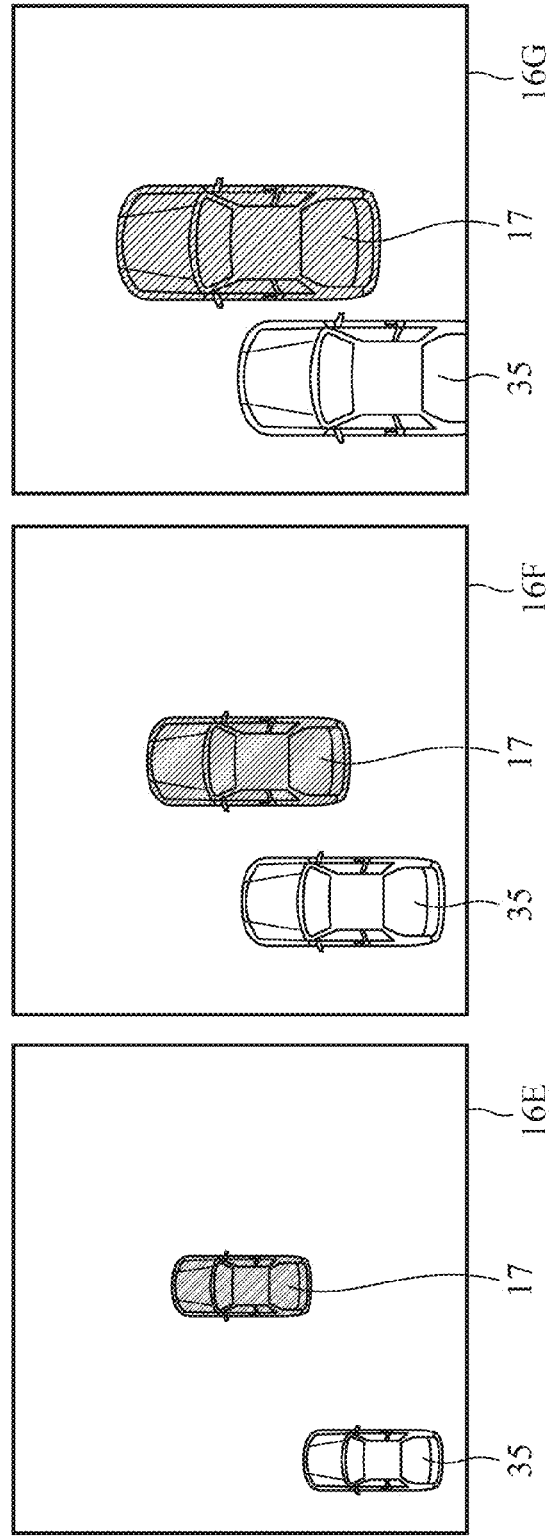

FIG.25A 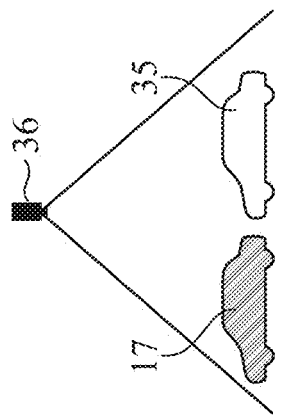 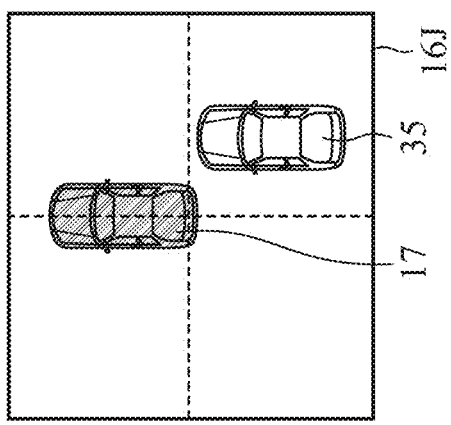
FIG.25B 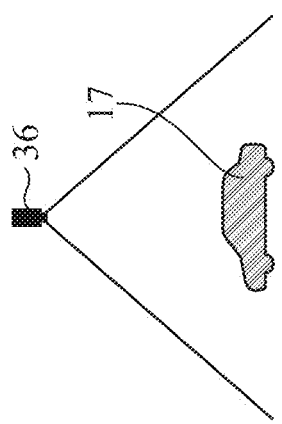 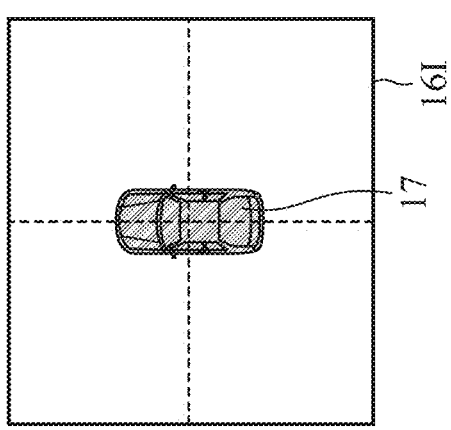
FIG.25C 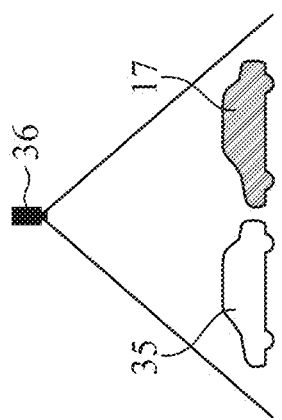 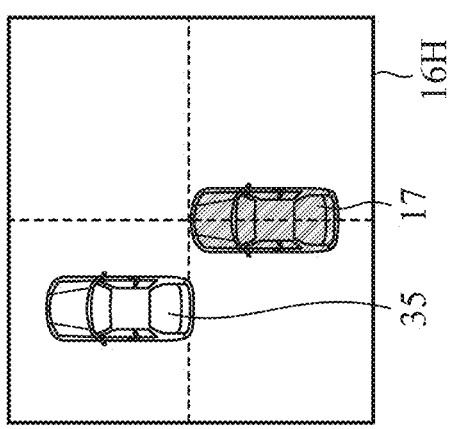

DRIVING SUPPORT APPARATUS AND DRIVING SUPPORT METHOD

TECHNICAL FIELD

The present invention relates to a driving support apparatus and driving support method for informing a user of the approach of a moving object to the user's vehicle.

BACKGROUND ART

A technique in which a display device arranged on the user's vehicle displays information about a moving object by using a mark or letters has been proposed. The technique is used for informing a user of the approach of the moving object to the user's vehicle.

For example, an information providing device disclosed in Patent Literature 1 identifies a vehicle that is likely to the approach to the user's vehicle. The device displays the identified vehicle with an icon, changes a size of the icon in accordance with a distance between the user's vehicle and the identified vehicle, and changes a stripe pattern which is a background image of the icon, in accordance with a speed of the identified vehicle. Thereby, the user can intuitively recognize the approach of the identified vehicle to the user's vehicle.

Patent Literature 2 discloses a driving support apparatus that displays a mark having an arrow shape representing either degree of approaching of another target vehicle to the user's vehicle or degree of leaving of another target vehicle from the user's vehicle when the target vehicle is located obliquely behind the user's vehicle.

In this apparatus, a guide line is displayed in addition to the mark having the arrow shape. The guide line indicates the risk to the user's vehicle due to the target vehicle traveling on a lane adjacent to the user's vehicle when the user's vehicle tries to move to the adjacent lane. For example, when the target vehicle is approaching the user's vehicle at a relatively high speed, the mark representing a movement of the target vehicle, which is a relatively long arrow toward the user's vehicle, is displayed such that the relatively long arrow is across the guide line. With such a display, the user can recognize that lane-change of the user's vehicle is risky because the target vehicle is approaching the user's vehicle.

CITATION LIST

Patent Literatures

Patent Literature 1: Japanese Patent Application Publication No. 2007-102577.
Patent Literature 2: Japanese Patent Application Publication No. 2008-15758.

Technical Problem

In the prior art, a displayed pattern of a moving object is changed in accordance with degree of approaching of the moving object to a user's vehicle. However, in the prior art, the user's vehicle is not displayed and a positional relationship between the user's vehicle and the moving object is not indicated. Thus, there exists a problem that a user cannot intuitively recognize a situation around the user's vehicle including the positional relationship between the user's vehicle and the moving object.

For example, the device disclosed in Patent Literature 1 does not display the user's vehicle, but displays the icon indicating the identified vehicle that is likely to approach the user's vehicle. The device indicates the degree of approaching of the identified vehicle to the user's vehicle by changing the size of the icon and changing the pattern of the background image. The user can recognize the direction in which the identified vehicle is present, based on a location of the icon appearing on a display screen. However, the user cannot intuitively recognize the situation around the user's vehicle, because the user needs to guess the positional relationship between the user's vehicle and the identified vehicle based on the change of the icon size and the change of the background image pattern.

The apparatus disclosed in Patent Literature 2 does not display the user's vehicle, similarly to the case of Patent Literature 1, and instead displays the arrow indicating the target vehicle and the guide line indicating the risk of the target vehicle to the user's vehicle. The user can roughly recognize the positional relationship between the user's vehicle and the target vehicle by using the guide line as a reference. However, the user needs to guess the positional relationship between the user's vehicle and the target vehicle based on both the arrow indicating the target vehicle and the guide line.

The present invention is made in order to solve the above-mentioned problem, and it is therefore an object of the present invention to provide a driving support apparatus and driving support method with which a user can intuitively recognize a situation around the user's vehicle including a positional relationship between the user's vehicle and a moving object around the user's vehicle.

Solution to Problem

In accordance with of the present invention, there is provided a driving support apparatus which includes: a processor to execute a program; and a memory to store therein the program which, when executed by the processor, causes the processor to perform operations. The operations include: acquiring a positional relationship between at least one moving object and one or more ranges of distance from a user's vehicle, each of the one or more ranges of distance being a range in which a notification of approach of the moving object to the user's vehicle is to be provided; causing a display device to display an image of nearby surroundings of the user's vehicle including images of the user's vehicle and threshold lines that define the one or more ranges of distance; and changing the image of nearby surroundings of the user's vehicle in accordance with the acquired positional relationship.

Advantageous Effects of Invention

According to the present invention, the image of the nearby surroundings of a user's vehicle is displayed, including the images of the user's vehicle and the threshold lines defining the one or more ranges of distance, each range of distance being a range in which a notification of the approach of the moving object to the user's vehicle is to be provided. Thereby, the user can intuitively recognize the situation around the user's vehicle including the positional relationship between the user's vehicle and the moving object around the user's vehicle.

BRIEF DESCRIPTION OF DRAWINGS

FIGS. 24A to 24C illustrate exemplary images displayed when the user's vehicle is viewed from various viewpoints at different vertical locations in a plan view;

FIGS. 25A to 25C illustrate exemplary images displayed when the user's vehicle is viewed from various viewpoints at different horizontal locations in a plan view;

DESCRIPTION OF EMBODIMENTS

Hereinafter, for detailed descriptions of the invention, various embodiments for carrying out the invention will be explained with reference to the drawings.

Embodiment 1

Figure 1A:
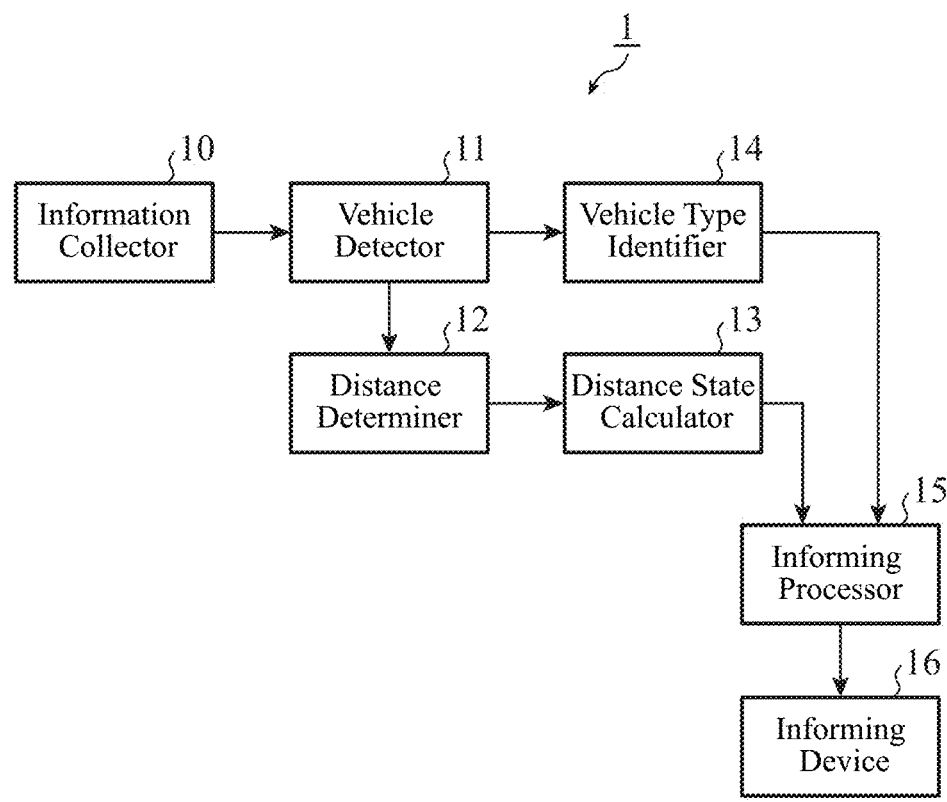
FIGS. 1A and 1B are diagrams illustrating a configuration of a driving support apparatus in accordance with Embodiment 1.
Figure 1B:
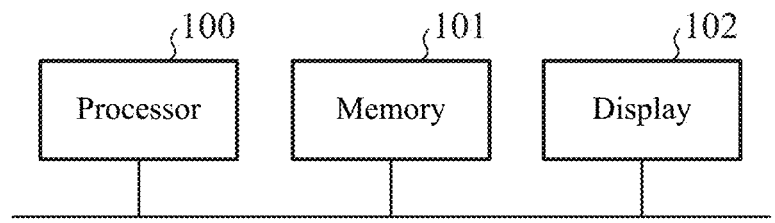

FIG. 1A and FIG. 1B are diagrams illustrating a configuration of a driving support apparatus 1 in accordance with Embodiment 1. FIG. 1A is a functional block diagram and FIG. 1B is a diagram of a hardware configuration. In FIG. 1A, the driving support apparatus 1 is an apparatus that informs a user of the approach of a moving object such as another vehicle to a user's vehicle. The driving support apparatus 1 includes an information collector 10, a vehicle detector 11, a distance determiner 12, a distance state calculator 13, a vehicle type identifier 14, an informing processor 15, and an informing device 16.

Among components of the driving support apparatus 1, the vehicle detector 11, the distance determiner 12, the distance state calculator 13, the vehicle type identifier 14, and the informing processor 15 can be constituted, for example, by a processor 100 such as a Central Processing Unit (CPU) or a system LSI (Large-Scale Integrated circuit). The processor 100 executes a program that is stored in a memory 101 shown in FIG. 1B. Processing circuits may work together to function as above-mentioned components.

The information collector 10 collects information indicating a situation around the user's vehicle, and transmits the collected information to the vehicle detector 11.

The information collector 10 can be implemented, for example, using any of devices: imaging devices such as a camera and an infrared camera, and various sensors such as a ranging sensor, a velocity sensor, a color sensor, and a millimeter wave radar.

Each of the camera and the infrared camera has an area for imaging that includes part of the surroundings of the user's vehicle and nearby areas at both sides of the user's vehicle, and obtains image information indicating the nearby surroundings of a user's vehicle. The ranging sensor and the millimeter wave radar obtain information on a distance between an object around the user's vehicle and the user's vehicle. The velocity sensor obtains information on a velocity of a moving object around the user's vehicle. The color sensor detects a color of the object around the user's vehicle.

The vehicle detector 11 detects at least one moving object moving in an area around the user's vehicle. The vehicle detector 11 identifies the moving object and a stationary object which exists around the user's vehicle, on the basis of information received from the information collector 10. Thus, the vehicle detector 11 obtains information on the moving object except for the stationary object. The vehicle detector 11 transmits the information on the moving object to the distance determiner 12 and the vehicle type identifier 14. Note that the information on the moving object includes the position, size and shape of the moving object as well as detected information indicating white lines at both sides of a lane on which the user's vehicle is traveling, and image information indicating part of areas at both sides of the user's vehicle.

For example, the vehicle detector 11 performs image analysis on a captured image of the nearby surroundings of a user's vehicle thereby to identify or detect an object as a moving object such as another vehicle traveling in front of, at the back of, or at one of the sides of the user's vehicle or a pedestrian walking on a shoulder of the road, and/or to identify or detect an object as a stationary object such as a building, a road sign, or a guard fence around the road on which the user's vehicle is traveling. Additionally, the vehicle detector 11 may determine whether the detected object is the moving object in accordance with temporal change in distance between the detected object and the user's vehicle, which is measured by the ranging sensor.

Note that the vehicle detector 11 may use information collected by an information collector provided by another apparatus other than the driving support apparatus 1. In this case, the driving support apparatus 1 may not have the information collector 10.

The distance determiner 12 determines the distance between the user's vehicle and the moving object detected by the vehicle detector 11. For example, the distance determiner 12 determines the distance between the user's vehicle and the moving object in accordance with location information of the moving object received from the vehicle detector 11, and transmits the determined distance, as measurement information of the distance associated with the moving object, to the distance state calculator 13.

Additionally, the distance determiner 12 may extract distance information on the moving object detected by the vehicle detector 11 from among pieces of distance information on objects around the user's vehicle obtained by the ranging sensor.

The distance determiner 12 calculates a lane width of a traffic route on which the user's vehicle is traveling, in accordance with the detected information indicating the white lines at both sides of the lane, which is included in the information on the moving object.

In addition, the distance determiner 12 calculates a width of the user's vehicle by performing image analysis on the image information indicating part of areas at both sides of the user's vehicle, which is included in the information on the moving object.

The measurement information of the distance associated with the moving object includes the measurement result of the distance between the moving object and the user's vehicle, as well as measurement information of the lane width of the traffic route on which the user's vehicle is traveling and the width of the user's vehicle.

The width of the user's vehicle can be measured by the distance determiner 12 as initial setting when the driving support apparatus 1 is installed on the user's vehicle. Alternatively, the width of the user's vehicle may be stored in advance in the distance state calculator 13 instead of being measured by the distance determiner 12.

The distance state calculator 13 is a component that responds to an acquiring unit in the invention, and performs a calculation on the basis of the measurement information obtained by the distance determiner 12 to thereby determine the positional relationship between the moving object and the one or more ranges of distance from the user's vehicle in which a notification of the approach of the moving object is to be provided.

For example, as setting information for the distance state calculator 13, distance thresholds, which define the range of distance from the user's vehicle in which a notification of approach of the moving object is to be provided, are set in advance for both sides of, in front of and at the back of the user's vehicle.

The distance state calculator 13 calculates the positional relationship indicating whether the moving object around the user's vehicle moves into the range of distance, on the basis of the distance between the user's vehicle and the moving object, which is measured by the distance determiner 12, the lane width of the traffic route on which the user's vehicle is traveling, the width of the user's vehicle, and the distance thresholds set in advance. Information indicating the positional relationship is transmitted to the informing processor 15 from the distance state calculator 13.

The vehicle type identifier 14 is a component corresponding to a determiner in the invention, to identify a type of the moving object detected by the vehicle detector 11. For example, the vehicle type identifier 14 matches image information indicating the moving object received from the vehicle detector 11, against pre-provided shape patterns of moving objects, thus identifying the type of the moving object, and transmits an object type identification result to the informing processor 15. As types of moving object, a normal-sized vehicle such as a sedan and a Sport Utility Vehicle (SUV), a large-sized vehicle such as a truck and a bus, a small-sized vehicle such as a motorcycle and a bicycle, a human being, and an animal are exemplified.

The informing processor 15 is a component that corresponds to an informing processor in the invention. For example, the informing processor 15 causes a display device of the informing device 16 to display the image of the nearby surroundings of a user's vehicle.

The image of the nearby surroundings of a user's vehicle includes images of the user's vehicle and threshold lines that define the one or more ranges of distance from the user's vehicle (e.g. an attention zone and an alert zone explained later with respect to FIG. 3) in each of which a notification of approach of the moving object is to be provided. Each threshold line is displayed as a line image corresponding to the distance threshold that defines a range of distance from the user's vehicle in which a notification of approach of the moving object is to be provided.

In addition, the informing processor 15 changes the image of the nearby surroundings of the user's vehicle in accordance with the positional relationship acquired by the distance state calculator 13. For example, in accordance with the positional relationship acquired by the distance state calculator 13, the informing processor 15 may change colors of the attention zone and the alert zone in the image of the nearby surroundings of the user's vehicle, and may causes an image of the moving object to appear in the image of the nearby surroundings of the user's vehicle, in accordance with the positional relationship acquired by the distance state calculator 13.

Moreover, the informing processor 15 selects, as an image to be displayed, the image of the moving object corresponding to the type of the moving object identified by the vehicle type identifier 14 from among pre-provided images of moving objects for each type.

Alternatively, the informing processor 15 may use a pre-provided image without relying on a type of moving object. In this case, the driving support apparatus 1 may not have the vehicle type identifier 14.

The informing device 16 is a unit to provide notification information for the user. The information unit 16 includes a display 102 that can at least visually inform the user of the information as shown in FIG. 1B.

The display 102 is a display device that is arranged at a place on which the user in the user's vehicle can visually focus with ease, and displays the image of the nearby surroundings of the user's vehicle generated by the informing processor 15. As the display 102, a display device disposed on a middle portion of a dashboard, a display device as an instrument panel, or a head-up display is exemplified. Note that the informing device 16 may be a display device mounted in a different apparatus other than the driving support apparatus 1. In this case, the driving support apparatus 1 may not have the informing device 16.

Next, operations will be described.

Figure 2:
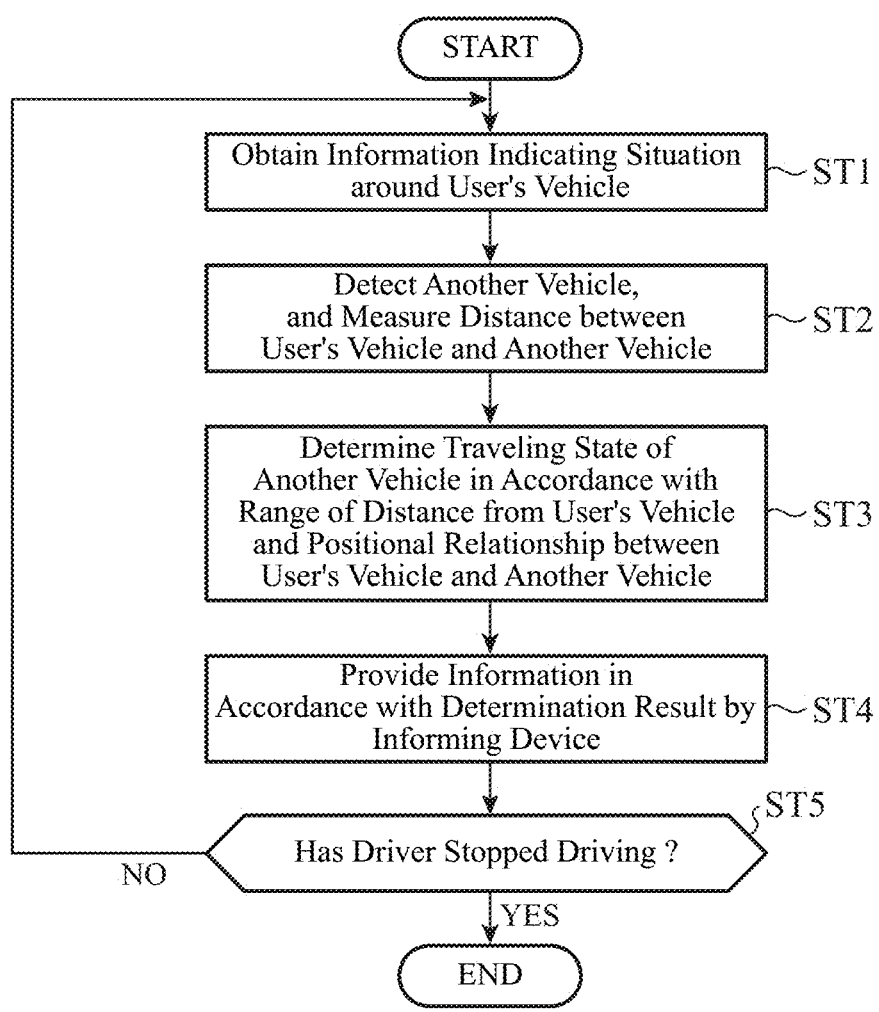
FIG. 2 is a flowchart illustrating operations of the driving support apparatus in accordance with Embodiment 1.

FIG. 2 is a flowchart illustrating operations of the driving support apparatus in accordance with Embodiment 1, and indicating operations in which the driving support apparatus informs the user of the approach of another vehicle to the user's vehicle.

In FIG. 2, processes in Steps ST1 to ST4 are consecutively and repeatedly executed until a user of the user's vehicle finishes driving.

First, the information collector 10 monitors the situation around the user's vehicle, and obtains the information indicating the situation around the user's vehicle (Step ST1). The information indicating the situation around the user's vehicle includes information about an object existing around the user's vehicle and information about the road on which the user's vehicle is traveling. When the object such as another vehicle around the user's vehicle is a moving object, the information collector 10 obtains a relative location of the moving object with respect to the user's vehicle in addition to appearance information such as the size and shape of the moving object. The information about the road on which the user's vehicle is traveling includes image data of separate white lines defining the lane.

Note that a plurality of information collectors 10 can be disposed, for example, at both sides of, in front of and at the back of the user's vehicle. Each information collector 10 independently and continuously obtains the information indicating the situation around the user's vehicle.

Information collection scope of the information collector 10 is a disc-like range spreading in a horizontal direction around each information collector. The radius of the disc-like range is, for example, about 10 meters. Note that the radius of the information collection scope depends on the types or capabilities of a sensor and a camera included in the information collector 10.

In Step ST2, the vehicle detector 11 receives the information indicating the situation around the user's vehicle obtained in real-time by the information collector 10, and, among the received information, identifies information on the moving object and information on the stationary object. The moving object is an object such as another vehicle, a human being or an animal around the user's vehicle, which has a probability of colliding with the user's vehicle when moving. The stationary object is an object such as a roadside tree, a guard fence or a road sign, which does not move.

Since the stationary object does not actively approach the user's vehicle, the stationary object is excluded from targets that should trigger notifications of approaches to the user's vehicle. On the other hand, the moving object has a probability of coming in contact with or colliding with the user's vehicle when both the user's vehicle and the moving object move, and thus is a target that should trigger a notification of approach to the user's vehicle.

After identifying the information on the moving object from the information indicating the situation around the user's vehicle, the vehicle detector 11 outputs the information on the moving object to the distance determiner 12 and the vehicle type identifier 14. The information on the moving object includes the relative location of the moving object with respect to the user's vehicle in addition to the appearance information of the moving object.

The distance determiner 12 extracts information corresponding to the relative location of the moving object with respect to the user's vehicle from among the information on the moving object. Then, the distance determiner 12 determines the distance between the moving object and the user's vehicle in accordance with the information corresponding to the relative location.

Note that the determination of the distance between the moving object and the user's vehicle is continuously and repeatedly executed for the moving object identified by the vehicle detector 11. The distance determiner 12 outputs the distance determined thereby between the moving object and the user's vehicle to the distance state calculator 13 one after another.

The vehicle type identifier 14 extracts the appearance information of the moving object from among the information on the moving object that is identified by the vehicle detector 11. Then, the vehicle type identifier 14 identifies the type of the moving object based on the appearance information.

For example, the vehicle type identifier 14 obtains a captured image of the moving object as the appearance information of the moving object, and performs image analysis on the captured image thereby to match an image of the moving object against the pre-provided shape pattern of the moving object, thus identifying the type of the moving object. As the types of a moving object, a normal-sized vehicle such as a sedan or a Sport Utility Vehicle (SUV), a large-sized vehicle such as a truck or a bus, a small-sized vehicle such as a motorcycle or a bicycle, a human being, and an animal are exemplified.

In Step ST3, the distance state calculator 13 performs a calculation on the basis of the measurement information obtained by the distance determiner 12 to thereby acquire the positional relationship between the moving object and the one or more ranges of distance from the user's vehicle in each of which a notification of the approach of the moving object to the user's vehicle is to be provided.

Note that the range of distance from the user's vehicle, in which a notification of the approach of the moving object is to be provided, is a range that is defined in accordance with predetermined distance thresholds from the user's vehicle. When the moving object is another target vehicle other than the user's vehicle, the distance state calculator 13 determines, as a traveling state of the target vehicle, a positional relationship as to whether the target vehicle moves into the range of distance. This determination process will be explained later in detail with reference to FIGS. 3 to 8.

In Step ST4, the informing processor 15 generates the image of the nearby surroundings of the user's vehicle including the images of the user's vehicle and the threshold lines defining at least one of the ranges of distance, and causes the display of the informing device 16 to display the image of the nearby surroundings of the user's vehicle.

When the informing processor 15 receives the traveling state of the target vehicle acquired by the distance state calculator 13 and the type of the target vehicle identified by the vehicle type identifier 14, the informing processor 15 superimposes the image of the target vehicle on the image of the nearby surroundings of the user's vehicle for display. In this way, the notification information based on the determination results generated by the distance state calculator 13 is provided by the informing device 16.

The display 16D of the informing device 16, which is disposed at the place on which the user can visually focus with ease, displays the image of the nearby surroundings of the user's vehicle in a plan-view or in a bird's-eye-view (For example, images 16A-16C and 16E). In the bird's-eye-view, the display displays a user's vehicle, a moving object, and a road R on which the user's vehicle is traveling, which are much more three-dimensional as compared to the plan-view image.

As the display disposed at the place on which the user can visually focus with ease, the display device disposed on the middle portion of the dashboard, the display device as the instrument panel, and the head-up display are exemplified.

Further, when the display displays, as the image of the target vehicle, an icon corresponding to the type of the target vehicle identified by the vehicle type identifier 14, the user can intuitively recognize the target vehicle.

The processes in Steps ST1 to ST4 are consecutively and repeatedly executed.

That is, when the user drives the user's vehicle (NO in Step ST5), the process returns to Step ST1 and a series of processes in Step ST1 to Step ST4 is repeatedly executed.

On the other hand, when the user stops driving the user's vehicle (YES in Step ST5), a series of processes in Step ST1 to Step ST4 is terminated. Note that the stop of driving corresponds to, for example, a state in which a drive portion such as an engine of the user's vehicle is stopped and power supply to electrical components of the user's vehicle is stopped.

Next, a determination process in Step ST3 shown in FIG. 2 will be described in detail.

An example of a case in which target vehicles as moving objects are present around the user's vehicle will be explained.

Figure 3:
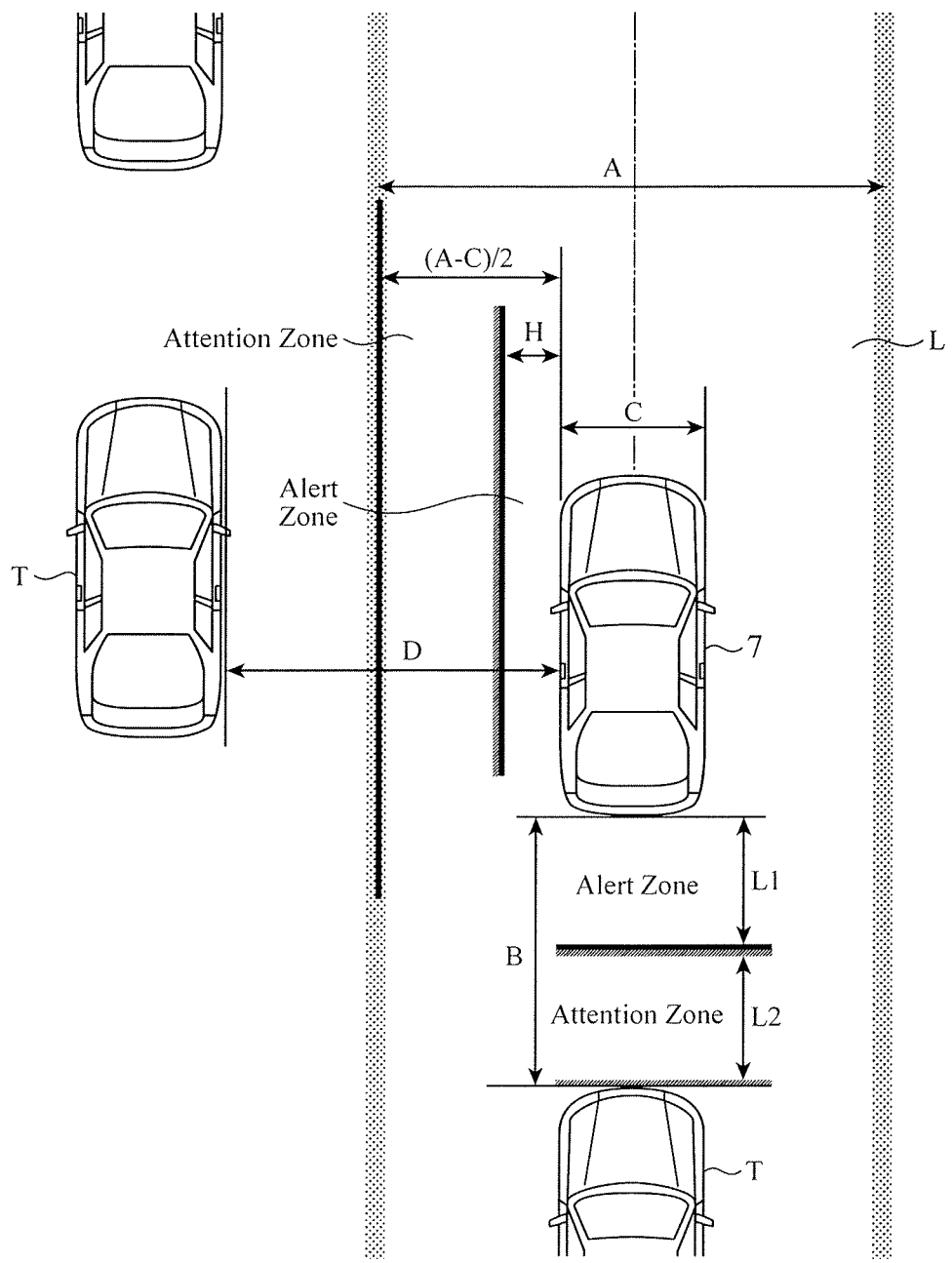
FIG. 3 is a schematic diagram illustrating ranges of distance in each of which a notification of the approach of another vehicle is to be provided.

FIG. 3 is a schematic diagram illustrating the ranges of distance in each of which a notification of the approach of another vehicle 1 is to be provided. In FIG. 3, it is assumed that the user's vehicle 7 is traveling on local streets in an ordinary state. Note that the traveling in an ordinary state means, for example, a traveling state in which the user's vehicle 7 is traveling on the road at a legal speed.

Figure 4:
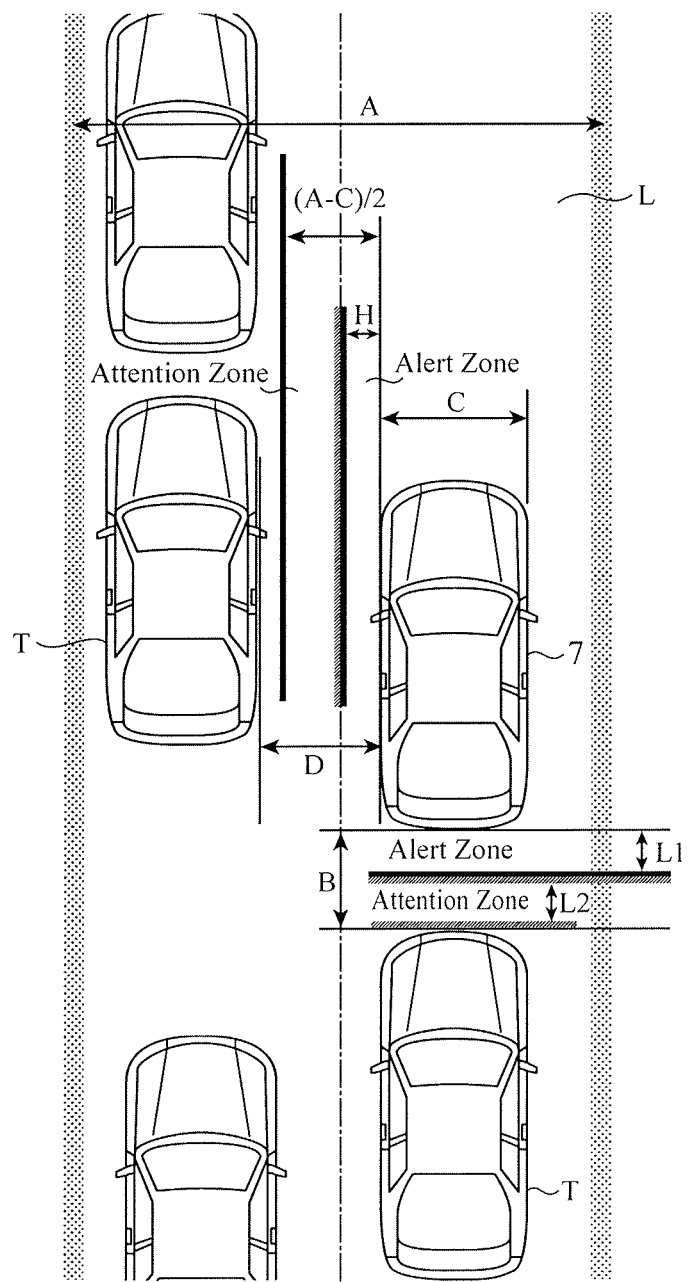
FIG. 4 is a schematic diagram illustrating the ranges of distance when relative velocities between a user's vehicle and the target vehicles are smaller as compared to the case shown in FIG. 3.
Figure 5:
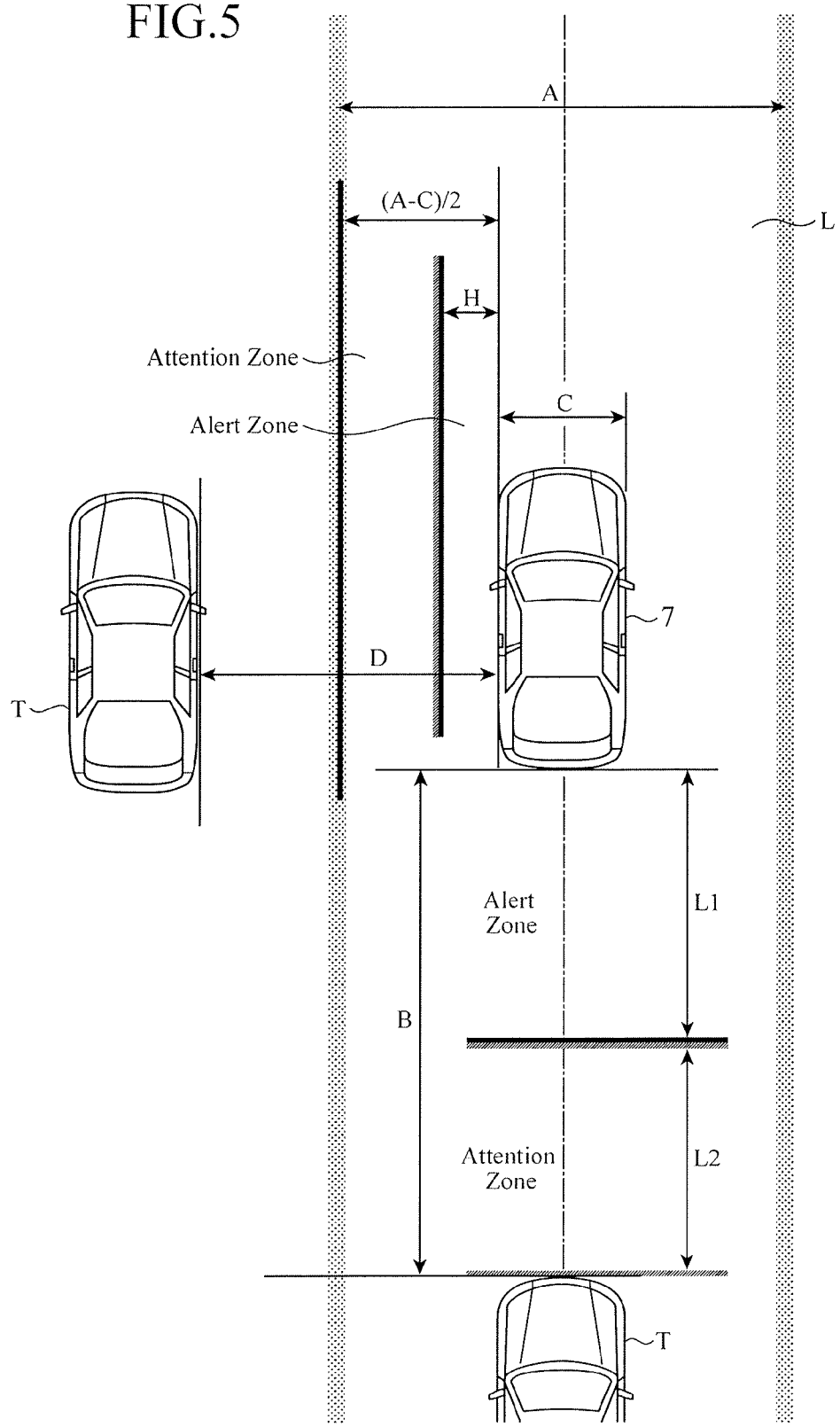
FIG. 5 is a schematic diagram illustrating the ranges of distance when the relative velocities between the user's vehicle and the target vehicles are larger as compared to the case shown in FIG. 3.

FIG. 4 is a schematic diagram illustrating the ranges of distance when relative velocities between the user's vehicle 7 and the target vehicles T are smaller as compared to the case shown in FIG. 3. FIG. 5 is a schematic diagram illustrating the ranges of distance when the relative velocities between the user's vehicle 7 and the target vehicles T are larger as compared to the case shown in FIG. 3.

In this invention, with regard to the positional relationship between a moving object and the range of distance from the user's vehicle, that is, the traveling state of the moving object, determined by the distance state calculator 13, there are three types of the traveling state of the target vehicle: a safe state, an attention-requiring state, and an alert state.

The safe state is a state in which the user's vehicle and a target vehicle are separated from each other such that the target vehicle is outside the attention zone set in advance. When this positional relationship is maintained, the user's vehicle is able to safely travel without coming in contact with the target vehicle.

The attention-requiring state is a state in which the distance between the user's vehicle and a target vehicle is in a predetermined attention zone but is outside an alert zone. The attention zone corresponds to a first range of distance in this invention, and has the probability that the target vehicle comes in contact with the user's vehicle in a case where the user's vehicle approaches the target vehicle through an operation of the user's vehicle, such as a lane-change or a left/right turn.

The alert state is a state in which the distance between the user's vehicle and a target vehicle is in a predetermined alert zone. The alert zone is the nearest zone away from the user's vehicle, and corresponds to a second range of distance in this invention. When the target vehicle moves into the alert zone, the user is required to immediately maneuver the user's vehicle to avoid contact with the target vehicle.

In FIG. 3, a lane width A is a width of the lane L on which the user's vehicle 7 is traveling. An inter-vehicle distance B is a distance between the user's vehicle 7 and another vehicle T behind the user's vehicle 7. A user's vehicle width C is a width of the user's vehicle 7. An inter-vehicle distance D is a distance between the user's vehicle 7 and another vehicle T at the left side of the user's vehicle 7.

A distance threshold H is a predetermined threshold value of the distance set at the left side of the user's vehicle 7. The distance threshold H defines the alert zone arranged at the left side of the user's vehicle 7. The range of distance L1 and the range of distance L2 correspond to predetermined threshold values of the distances set at the back of the user's vehicle 7. L1 defines the alert zone arranged at the back of the user's vehicle 7. L2 defines the attention zone arranged at the back of the user's vehicle 7.

Note that both the attention zone and the alert zone are set at the left side of the user's vehicle 7 and at the back of the user's vehicle 7 in FIG. 3. Alternatively, these zones may be set at the right side of the user's vehicle 7 and in front of the user's vehicle 7.

Conditions for the positional relationship indicating the safe state are represented by the following expression (1).

$$D > (A-C)/2 \text{ or } B \geq (L1+L2) \qquad (1)$$

When the positional relationship between the user's vehicle 7 and the target vehicle T satisfies the expression (1), the target vehicle T is outside the attention zone. Thus, the traveling state of the target vehicle T is judged as being the safe state.

Conditions for the positional relationship indicating the attention-requiring state are represented by the following expression (2).

$$(A-C)/2 \geq D > H \text{ or } (L1+L2) > B \geq L1 \qquad (2)$$

When the positional relationship between the user's vehicle 7 and the target vehicle T satisfies the expression (2), the target vehicle T is in the attention zone. Thus, the traveling state of the target vehicle T is judged as the attention-requiring state.

Conditions for the positional relationship indicating the alert state are represented by the following expression (3).

$$H \geq D \text{ or } L1 \geq B \qquad (3)$$

When the positional relationship between the user's vehicle 7 and the target vehicle T satisfies the expression (3), the target vehicle T is in the alert zone. Thus, the traveling state of the target vehicle T is judged as the alert state.

The distance thresholds H, L1, L2 are predetermined by the distance state calculator 13 using the lane width A, and may be set to any values by the user.

Alternatively, the distance state calculator 13 may dynamically change the distance thresholds H, L1, L2 in accordance with a traveling scene or a traveling situation of the user's vehicle 7. In this case, the above-mentioned conditions for the positional relationship are automatically changed in accordance with the traveling scene or the traveling situation of the user's vehicle 7.

For example, the distance threshold H set at the left side of the user's vehicle 7 can be classified into the following three threshold values: a value Hn for a close distance from the user's vehicle 7, a value Hm for an intermediate distance from the user's vehicle 7, and a value Hf for a far distance from the user's vehicle 7. The distance threshold H can be changed into one of the threshold values Hn, Hm, and Hf in accordance with the traveling scene or the traveling situation of the user's vehicle 7.

Similarly, the distance thresholds L1, L2 set at the back of the user's vehicle 7 can be classified into the following three pairs of values: a pair of values L1$n$, L2$n$ for close distances from the user's vehicle 7, a pair of values L1$m$, L2$m$ for intermediate distances from the user's vehicle 7, and a pair of values L1$f$, L2$f$ for far distances from the user's vehicle 7. The distance thresholds L1, L2 can be changed into one of the pair of L1$f$ and L2$f$, the pair of L1$m$ and L2$m$, and the pair of L1$f$ and L2$f$ in accordance with the traveling scene or the traveling situation of the user's vehicle 7.

Let us assume that the user's vehicle is stuck in a traffic jam or the user's vehicle is waiting for traffic signal change. In such a traveling scene, the relative velocity between the user's vehicle and the target vehicle is smaller as compared to the case in which the user's vehicle is traveling at the legal speed set for the local road.

Also, in a traveling situation where the relative velocity between the user's vehicle and the target vehicle, which is measured by the vehicle detector 11, is less than a predetermined threshold value of relative velocity, the relative velocity between the user's vehicle and the target vehicle is smaller as compared to the case in which the user's vehicle is traveling at the legal speed set for the local road.

Such a traveling scene or a traveling situation is illustrated in FIG. 4. In this case, a probability of contact between the user's vehicle 7 and the target vehicle T is lower as compared to the case in which the user's vehicle 7 is traveling at the legal speed set for the local road. Thus, the distance state calculator 13 changes distance thresholds L1, L2 into the threshold values Hn, L1$n$, L2$n$, respectively.

Thereby, the attention zone and the alert zone become narrower as shown in FIG. 4.

On the other hand, let us assume that the user's vehicle is traveling on a highway. In such a traveling scene, the relative velocity between the user's vehicle and the target vehicle is larger as compared to the case in which the user's vehicle is traveling at the legal speed set for the local road. Let us assume that the relative velocity between the user's vehicle and the target vehicle, which is measured by the vehicle detector 11, is more than a predetermined threshold value of relative velocity. In such a traveling situation, the relative velocity between the user's vehicle and the target vehicle is larger as compared to the case in which the user's vehicle is traveling at the legal speed set for the local road.

Such a traveling scene or a traveling situation is illustrated in FIG. 5. In this case, a probability of contact between the user's vehicle 7 and a following target vehicle T is higher as compared to the case in which the user's vehicle 7 is traveling at the legal speed set for the local road. Thus, the distance state calculator 13 changes distance thresholds L1, L2 of the distances into the threshold values L1$f$, L2$f$, respectively. Thereby, the attention zone and the alert zone at the back of the user's vehicle 7 become broader as shown in FIG. 5.

In the case shown in FIG. 5, the relative velocity between the user's vehicle 7 and another vehicle T that is present at the left side of the user's vehicle 7 is not substantially changed. Thus, the distance state calculator 13 does not change the distance threshold H shown in FIG. 3.

As mentioned above, the distance threshold H set at the left side of the user's vehicle 7 and the distance thresholds L1, L2 set at the back of the user's vehicle 7 may not be necessarily changed at the same time, and are appropriately changed in accordance with the traveling scene or the traveling situation.

Next, a displaying process for displaying the image of the nearby surroundings of the user's vehicle in Step ST4 shown in FIG. 2 will be described in detail.

The informing processor 15 displays, on the display, the icon corresponding to the type of a moving object identified by the vehicle type identifier 14, in accordance with the positional relationship between the moving object and the range of the distance from the user's vehicle, which is successively calculated and acquired by the distance state calculator 13.

Figure 6:
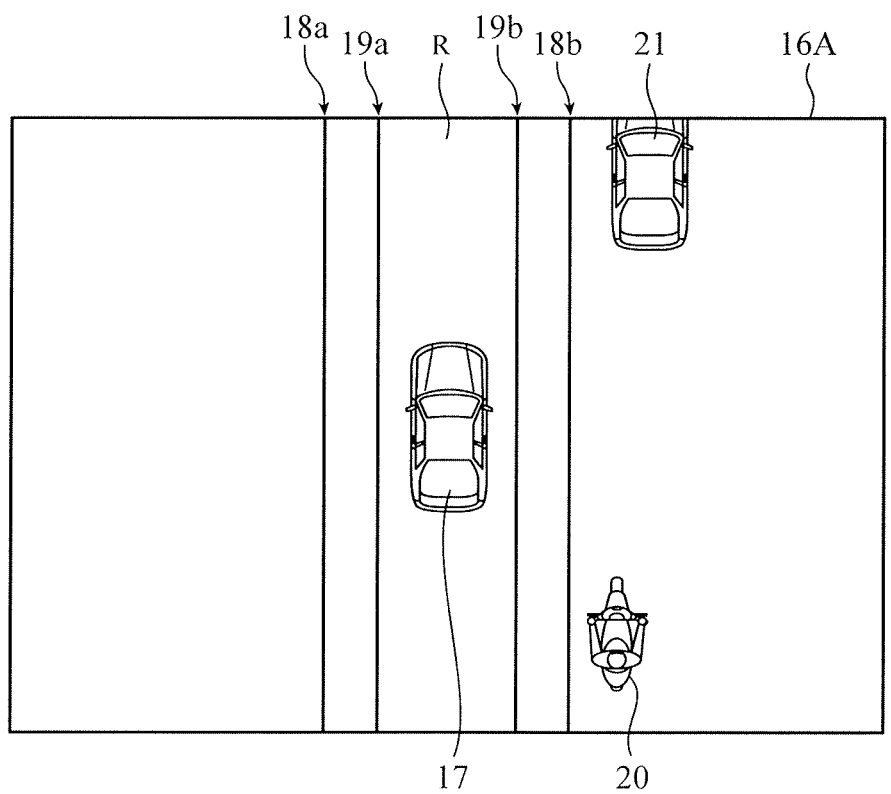
FIG. 6 illustrates an image of the nearby surroundings of a user's vehicle including images of the user's vehicle and threshold lines arranged at the sides of the user's vehicle.

FIG. 6 illustrates the image of the nearby surroundings of a user's vehicle displayed by the informing device 16, including the images of the user's vehicle and threshold lines arranged at the sides of the user's vehicle. In FIG. 6, the nearby surroundings of the user's vehicle are viewed in a plan view. In the image 16A of the nearby surroundings of the user's vehicle as shown in FIG. 6, an icon 17 indicating the user's vehicle is located at the center of the image. At both sides of the icon 17 indicating the user's vehicle, a plurality of the threshold lines 18$a$, 19$a$, 18$b$, 19$b$ is displayed.

Moreover, in the image 16A of the nearby surroundings of the user's vehicle, icons 20, 21 indicating target vehicles as moving objects around the user's vehicle are displayed.

The threshold lines 19$a$, 19$b$ disposed in the lateral direction, which are arranged at close distances from the user's vehicle and at both sides of the user's vehicle, correspond to the distance thresholds that define alert zones arranged at the lateral sides of the user's vehicle. The threshold lines 19$a$, 19$b$ can be obtained by drawing lines along the road R, each line passing through a point located the distance H away from one lateral side of the user's vehicle 7 as shown in FIGS. 3 to 5.

The alert zones arranged at the lateral sides of the user's vehicle correspond to the range of distance that is a region sandwiched in between the threshold lines 19$a$ and 19$b$.

For example, the alert zone is a surrounded zone defined by margin distances set in front of and at the back of the user's vehicle and the distance thresholds H set at the lateral sides of the user's vehicle. Even when another target vehicle beyond the margin distances is traveling ahead of or behind the user's vehicle and passes across the threshold line 19$a$ or 19$b$, the target vehicle is not judged to have moved into the alert zone. The margin distances may be set based on the distance thresholds L1 and L2 set in front of and at the back of the user's vehicle.

Alternatively, without using the margin distances, the alert zone may be a surrounded zone defined by a distance substantially equal to the longitudinal length of the user's vehicle and the distance thresholds H set at the lateral sides of the user's vehicle.

The threshold lines 18$a$, 18$b$ disposed in the lateral direction, which are arranged at both sides of the user's vehicle, correspond to the distance thresholds that define attention zones arranged at both sides of the user's vehicle. The threshold lines 18a, 18b can be obtained by drawing lines along the road R, each line passing through a point located the threshold distance of (A−C)/2 away from one side of the user's vehicle.

The attention zones arranged at the lateral sides of the user's vehicle correspond to the ranges of distance that are regions sandwiched in between the threshold lines 18a and 18b and positioned beyond the threshold lines 19a and 19b.

For example, the attention zones are surrounded zones defined by margin distances set in front of and at the back of the user's vehicle and the distances (A−C)/2−H set at the lateral sides of the user's vehicle. Even when the target vehicle traveling ahead of or behind the user's vehicle and beyond the margin distances from the user's vehicle passes across the threshold line 18a or 18b, the target vehicle is not judged to have moved into the attention zone. The margin distances may be set based on the distance thresholds L1 and L2 set in front of and at the back of the user's vehicle. Alternatively, without using the margin distances, the attention zone may be a surrounded zone defined by a distance substantially equal to the longitudinal length of the user's vehicle and the distances (A−C)/2−H set at the lateral sides of the user's vehicle.

Figure 7:
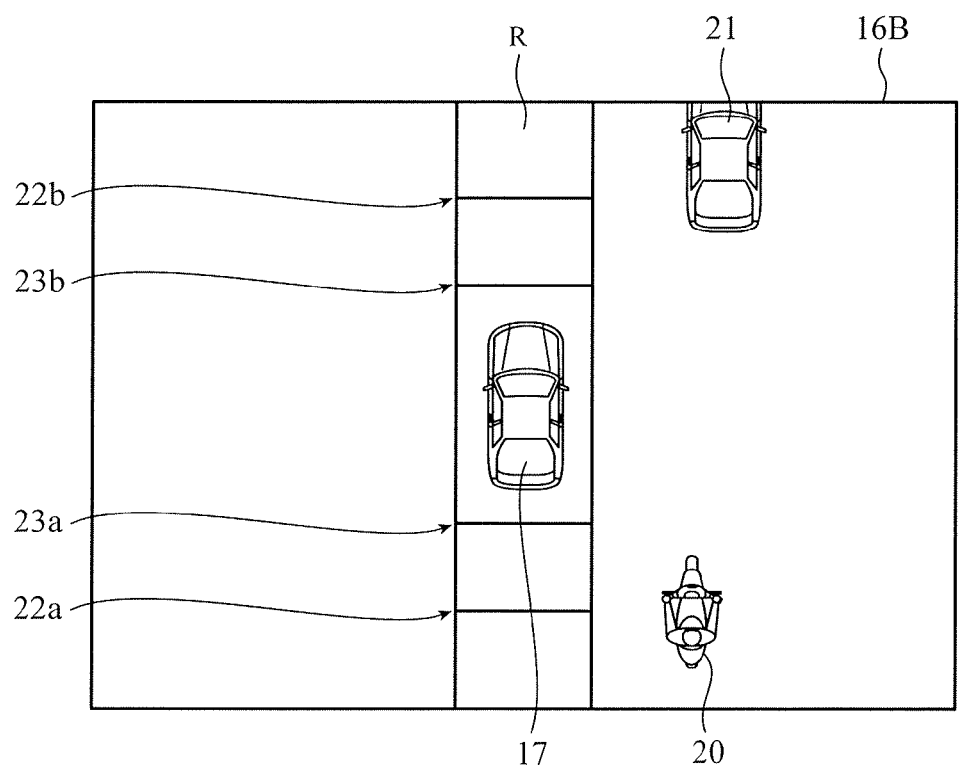
FIG. 7 illustrates an image of the nearby surroundings of a user's vehicle including images of the user's vehicle and threshold lines arranged in front of and at the back of the user's vehicle.

FIG. 7 illustrates an image of the nearby surroundings of a user's vehicle including the images of the user's vehicle and threshold lines arranged in front of and at the back of the user's vehicle. In FIG. 7, the nearby surroundings of the user's vehicle are viewed in a plan view like FIG. 6. In the image 16B of the nearby surroundings of the user's vehicle as shown in FIG. 7, the icon 17 indicating the user's vehicle is located at the center of the image. In front of the icon 17 of the user's vehicle, threshold lines 22b, 23b are displayed. At the back of the icon 17 of the user's vehicle, threshold lines 22a, 23a are displayed.

Moreover, in the image 16B of the nearby surroundings of the user's vehicle, the icons 20, 21 indicating the target vehicles as moving objects around the user's vehicle are displayed.

The threshold lines 23a, 23b, which are arranged at close distances from the user's vehicle and in front of and at the back of the user's vehicle, correspond to the distance thresholds that define an alert zone. Each threshold line is, for example, a displayed line that passes through a point the threshold distance of L1 away from the front or rear of the user's vehicle shown in FIGS. 3 to 5. The alert zone arranged at the front and rear of the user's vehicle is the range of distance that is a region sandwiched in between the threshold lines 23a and 23b.

The threshold lines 22a, 22b, which are arranged in front of or at the back of the user's vehicle, correspond to the distance thresholds that define attention zones in front of and at the back of the user's vehicle. Each threshold line is, for example, a displayed line that passes through a point the threshold distance of (L1+L2) away from the front or rear of the user's vehicle shown in FIGS. 3 to 5.

The attention zones in front of and at the back of the user's vehicle are the ranges of distance that are disposed beyond the threshold lines 23a, 23b and sandwiched in between the threshold lines 22a and 22b.

Figure 8:
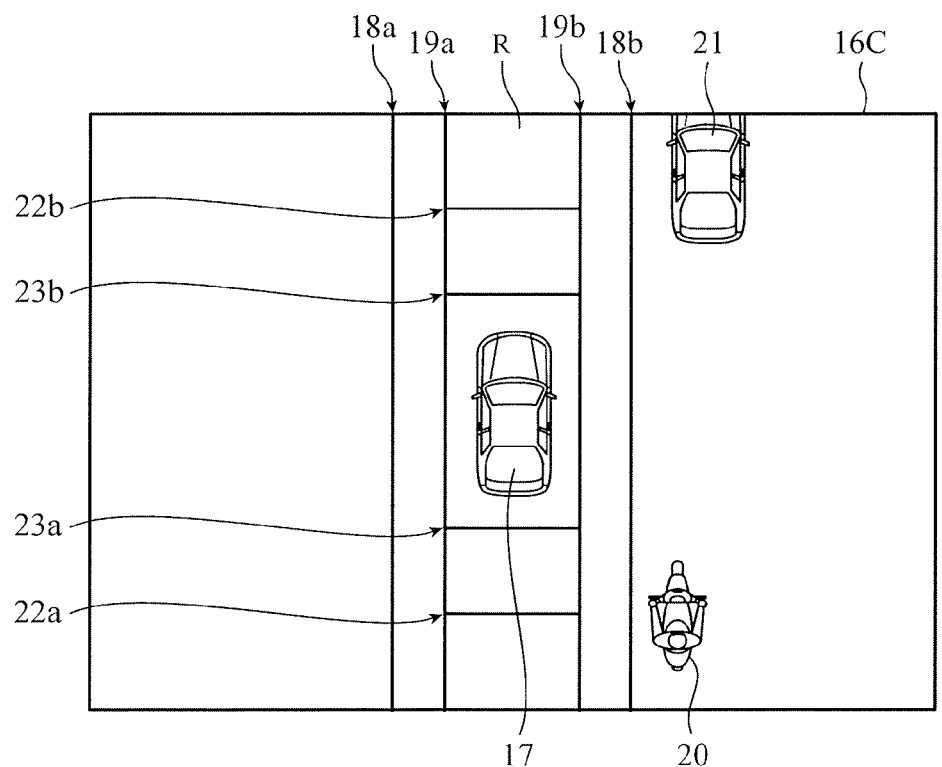
FIG. 8 illustrates an image of the nearby surroundings of a user's vehicle including images of the user's vehicle and threshold lines arranged at the sides of, in front of and at the back of the user's vehicle.

FIG. 8 illustrates an image of the nearby surroundings of a user's vehicle including the images of the user's vehicle and threshold lines arranged at the sides of, in front of and at the back of the user's vehicle. In FIG. 8, the nearby surroundings of the user's vehicle are viewed in a plan view.

As shown in FIG. 8, the image 16C of the nearby surroundings of the user's vehicle shows a combination of the attention zone and alert zone shown in FIG. 6 and the attention zone and alert zone shown in FIG. 7.

The threshold lines shown in FIGS. 6 to 8 may be displayed at a prescribed small scale corresponding to actual distances of the real world. Alternatively, the threshold lines may be displayed at a larger scale to enhance visibility of the user.

The moving object around the user's vehicle is continuously displayed by the icon corresponding to the type of the moving object.

Figure 9:
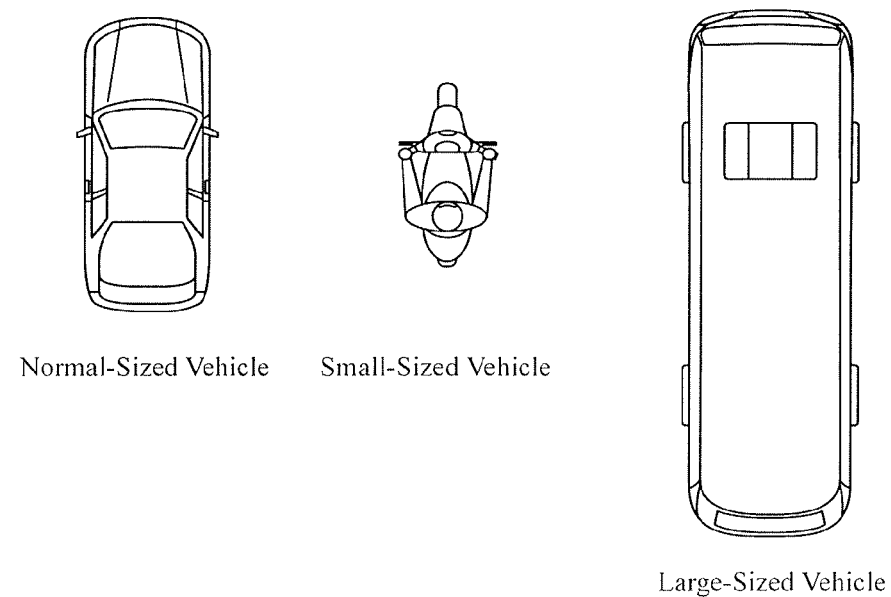
FIG. 9 is a diagram illustrating examples of icons indicating target vehicles, each icon being set corresponding to one vehicle type.

FIG. 9 is a diagram illustrating examples of icons indicating target vehicles. Each icon is set corresponding to a vehicle type. In the informing processor 15, the icons corresponding to the vehicle types are registered in advance. The vehicle types represent a normal-sized vehicle, a small-sized vehicle, and a large-sized vehicle as shown in FIG. 9. The informing processor 15 matches the type of a target vehicle identified by the vehicle type identifier 14, against the registered vehicle types associated with the icons, thus identifying its corresponding icon.

Correspondences between the types of moving objects and the icons may be set by a user.

In this case, since the moving object is displayed by the icon set by the user himself/herself, he/she can more easily recognize the type of the moving object that is approaching to the user's vehicle.

Next, the change of the image of the nearby surroundings of the user's vehicle in accordance with the traveling state of another target vehicle will be explained.

Figure 10:
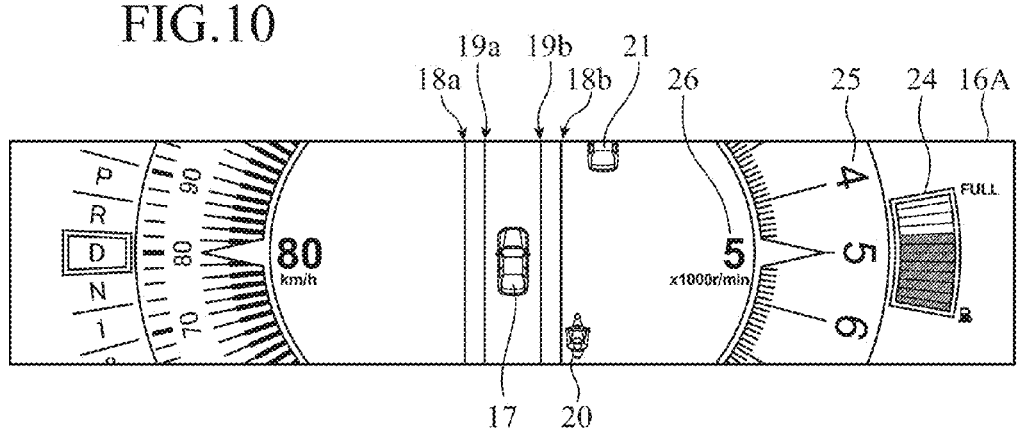
FIG. 10 is a diagram illustrating an exemplary image displayed when the driving of another target vehicle to the user's vehicle is in a safe state.
Figure 11:
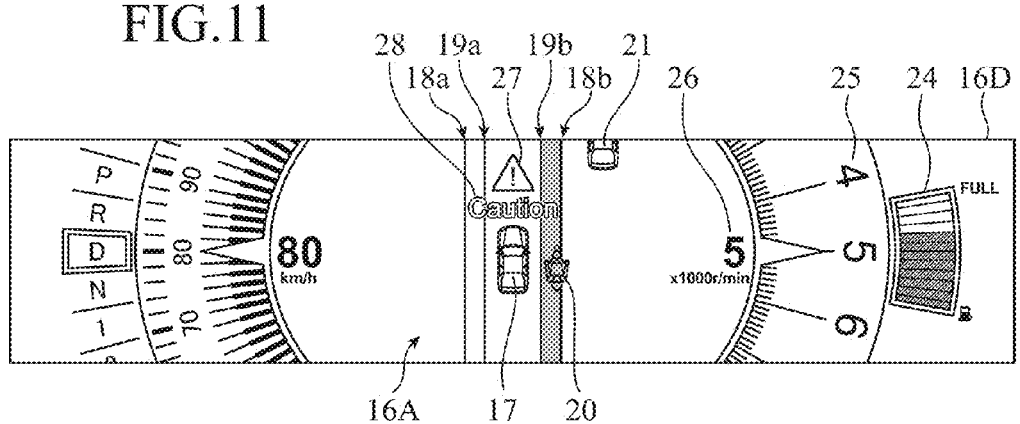
FIG. 11 is a diagram illustrating an exemplary image displayed when the driving of another target vehicle to the user's vehicle is in an attention-requiring state.
Figure 12:
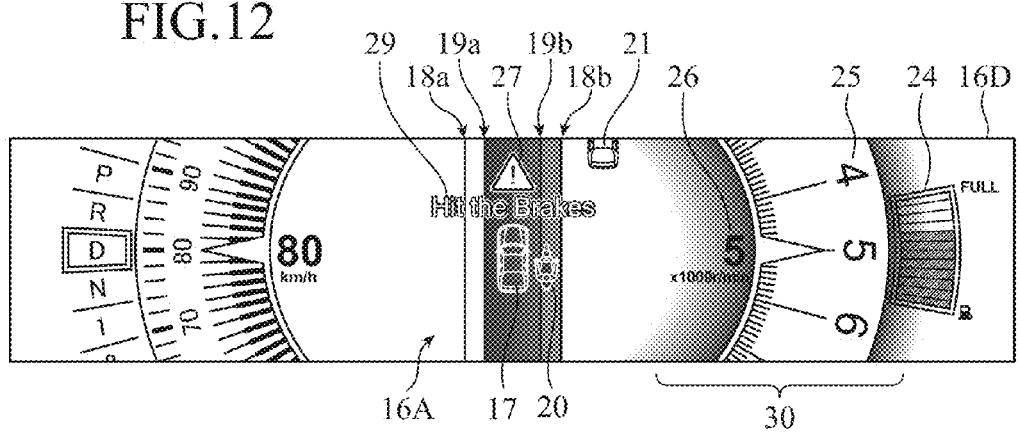
FIG. 12 is a diagram illustrating an exemplary image displayed when the driving of another target vehicle to the user's vehicle is in an alert state.
Figure 13:
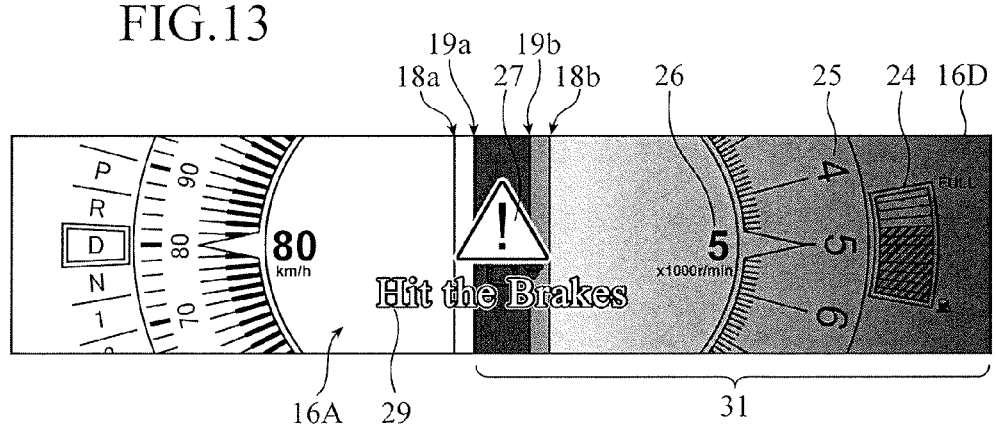
FIG. 13 is a diagram illustrating an exemplary image displayed when the target vehicle further approaches the user's vehicle from a position shown in FIG. 12.

FIG. 10 is a diagram illustrating an exemplary image 16A displayed on the display 16D when the driving of the target vehicle to the user's vehicle is in a safe state. FIG. 11 is a diagram illustrating an exemplary image 16A displayed on the display 16D when the driving of the target vehicle to the user's vehicle is in an attention-requiring state. FIG. 12 is a diagram illustrating an exemplary image displayed when the driving of the target vehicle to the user's vehicle is in an alert state. FIG. 13 is a diagram illustrating an exemplary image displayed when the target vehicle further approaches the user's vehicle from a position shown in FIG. 12.

FIGS. 10 to 13 illustrate representations of exemplary images of the nearby surroundings of a user's vehicle displayed on a display screen 16D of an instrument panel in the user's vehicle. Specifically, the display screen 16D displays the image 16A of the nearby surroundings of a user's vehicle, in addition to display items in the instrument panel, such as a residual fuel meter 24, a tachometer 25, and a current value 26 of a vehicle's engine speed.

When a moving object with a safe state is outside the attention zone set for the user's vehicle, the icon 17 indicating the user's vehicle and the threshold lines 18a, 19a, 18b, 19b that define the above-described zones are appearing in the image 16A of the nearby surroundings of the user's vehicle.

In this regard, as shown in FIG. 10, even in the case of the safe state, the icons 20, 21 indicating other target vehicles detected around the user's vehicle may be displayed to appear in the image 16A of the nearby surroundings of the user's vehicle.

Note that the positional relationship between each zone set for the user's vehicle and the target vehicle is updated in real-time by using consecutively calculated positional relationship acquired by the distance state calculator 13.

Moreover, in the case of the safe state, the icon 17 indicating the user's vehicle and the icons 20, 21 indicating the target vehicles are displayed with a default color. This default color may be the same color as a background color of the image 16A of the nearby surroundings of the user's vehicle so as not to draw attention of the user.

When the target vehicle moves into an attention zone from the position shown in FIG. 10 while being kept outside an alert zone, if the distance state calculator 13 determines that the an attention-requiring state occurs, the informing processor 15 changes the image 16A of the nearby surroundings of the user's vehicle into a display pattern corresponding to the attention-requiring state.

For example, as shown in FIG. 11, when the target vehicle moves into the attention zone arranged at the right side of the user's vehicle, the informing processor 15 changes both the color of the icon 20 indicating the target vehicle that has moved into the attention zone and the color of the right-hand region including this attention zone, into an attention-drawing color. The attention-drawing color corresponds to a first color in this invention. The attention-drawing color is, for example, yellow that is capable of drawing the attention of the user. However, since attitudes toward colors depend on countries and their cultures, the attention-drawing color is not limited to yellow in this invention.

The informing processor 15 causes a display item drawing the attention of the user to appear near the icon 17 indicating the user's vehicle in the image 16A of the nearby surroundings of the user's vehicle.

The display item drawing the attention can be freely selected under the condition that the display item can draw the attention of the user about the approach of the target vehicle to the user's vehicle. For example, the display items are an attention mark 27 and letters 28 of "Caution". In FIG. 11, the display items are arranged in front of and in the traveling direction of the user's vehicle. Alternatively, the display items can be arranged at another place on which the user can visually focus with ease.

With such a display, the user can intuitively recognize which direction the user should pay attention to.

In addition, in the image 16A of the nearby surroundings of the user's vehicle, the threshold lines 18a, 19a, 18b, 19b that define attention zones at both sides of the user's vehicle are displayed so as to extend along the road R on which the user's vehicle is traveling. When the target vehicle moves into the attention zone arranged at one side of the user's vehicle, the informing processor 15 changes the color of the attention zone arranged at the corresponding side of the user's vehicle and appearing in the image 16A of the nearby surroundings of the user's vehicle, into an attention-drawing color. In this case, the informing processor 15 may change the color of the whole area partitioned by the threshold lines 18a, 19a, 18b, 19b, into the attention-drawing color. For example, when another target vehicle approaches the user's vehicle from the right side of the user's vehicle, the informing processor 15 can change the color of a band-shaped area arranged at the right side of the user's vehicle including the attention zone, into the attention-drawing color.

With such a display, the user can intuitively recognize the direction in which the target vehicle approaches from an area at either one of the lateral sides of the user's vehicle.

Note that the change to the attention-drawing color may be applied to the attention zone or a region including the attention zone, and it is not necessary to change the color of the icon indicating the target vehicle which has moved into the attention zone.

Next, when the target vehicle further moves into the alert zone from the position shown in FIG. 11, if the distance state calculator 13 determines that an alert state occurs, the informing processor 15 changes the contents of the image 16A of the nearby surroundings of the user's vehicle into a display pattern corresponding to the alert state. With regard to the alert state, for example, the informing processor 15 provides notification of an alert classified into two levels, to the user.

As shown in FIG. 12, when the target vehicle passes across the threshold line 19b, the informing processor 15 changes both the color of the alert zone and the color the icon 20 indicating the target vehicle which has moved into the alert zone, from the default color into an alert color which is red. The informing processor 15 also changes the color of the attention zone through which the target vehicle moves into the alert zone, into a different alert color, such as pale red, which differs in tone from the alert color.

The alert color corresponds to a second color in this invention. As the alert color, red providing high visibility is exemplified. However, since the attitudes toward colors depend on countries and their cultures, the alert color is not limited to red in this invention.

As mentioned above, the ranges of distance from the user's vehicle, such as the attention zone and the alert zone, are set at different regions depending upon distances from the user's vehicle.

When the target vehicle moves into one or more ranges of the ranges of distance, the informing processor 15 changes the display colors of the one or more ranges of distance or the display colors of both the image of the target vehicle and the one or more ranges of distance, in a manner that the display color of the alert zone which is a close range of distance from the user's vehicle is different from the display color of the attention zone which is a far range of distance from the user's vehicle. Thereby, the user can intuitively recognize that the target vehicle approaches the user's vehicle at what range of distance, on the basis of the change of the displayed color.

Moreover, the informing processor changes the display color of the attention zone through which the target vehicle has passed, into a color resembling the alert color, in addition to the changing of the color of the alert zone. Thereby, the user can easily recognize the direction from which the target vehicle approaches the user's vehicle, on the basis of a stepwise color change.

Moreover, the informing processor 15 causes an alert display item to appear near the icon 17 indicating the user's vehicle in the image 16A of the nearby surroundings of the user's vehicle.

The alert display item can be freely selected under the condition that the alert display item can alert the user that the driving maneuver to avoid the approach of the target vehicle to the user's vehicle is required. For example, alert display items are the attention mark 27 and letters 29 of "Hit the Brakes". With such a display, the user can intuitively recognize that the target vehicle approaches the user's vehicle by a position where the target vehicle is likely to come in contact with the user's vehicle.

In FIG. 12, the alert display items are arranged at the front side of the icon 17 in the traveling direction of the user's vehicle. Alternatively, the display items may be arranged at another place on which the user can visually focus with ease.

As described above, when another target vehicle moves into the attention zone or the alert zone, the informing processor 15 changes the contents and sizes of the mark and displayed letters which are associated with drawing of the attention of the user, in a manner that the contents and sizes differ between the attention zone that is a far range of distance from the user's vehicle, and the alert zone that is a close range of distance from the user's vehicle.

With such a display, the user can intuitively recognize how close the target vehicle is to the user's vehicle, on the basis of the contents of the mark and the displayed letters.

Moreover, when the target vehicle passes across the threshold line 19b, as shown in FIG. 12, the informing processor 15 causes the display screen 16D of the display device to display a translucent blur 30 with an alert color in a region corresponding to the direction from which the target vehicle approaches the user's vehicle.

Note that the translucent blur 30 is semi-transparent and is displayed as a gradation pattern in which the alert color gradually becomes deeper toward the direction from which the target vehicle approaches the user's vehicle.

With such a display, the user can recognize the direction in which the target vehicle approaches the user's vehicle. Thus, the user can intuitively recognize that it is necessary to hit the brakes because the target vehicle approaches the user's vehicle from the right side.

Alternatively, a plurality of light emitting elements may be disposed at places on which the user can visually focus with ease. The informing processor 15 can cause the light emitting element disposed at the place close to the target vehicle in the direction in which the target vehicle approaches the user's vehicle, to emit light instead of using the translucent blur 30. In this case, the plurality of light emitting elements can be used as the informing device 16.

Next, when the target vehicle further moves into the alert zone from the position shown in FIG. 12, the informing processor 15 changes the image 16A of the nearby surroundings of the user's vehicle into a display pattern corresponding to a higher alert state.

For example, as shown in FIG. 13, the informing processor 15 enlarges the size of the alert display items as compared to the case shown in FIG. 12, and arranges the enlarged alert display items at the center of the image 16A of the nearby surroundings of the user's vehicle. Thereby, the user can strongly recognize that it is necessary to hit the brakes.

Moreover, the informing processor 15 changes the translucent blur 30 into a blur 31 and enlarges the displayed area of the blur as the target vehicle approaches the user's vehicle. In the case where, as shown in FIG. 13, the target vehicle approaches the user's vehicle from the right side, the blur 31 is displayed on the right-hand portion of the display screen 16D.

Note that the blur 31 is also a translucent blur colored with the alert color like the translucent blur 30. The blur 31 is displayed as a gradation pattern in which the alert color gradually becomes deeper toward the direction from which the target vehicle approaches the user's vehicle.

With such a display, when the user glances at the display screen 16D, from the large-sized blur 31, the user can easily recognize that the right side of the user's vehicle will be in a dangerous state due to the approach of the target vehicle.

Figure 14:
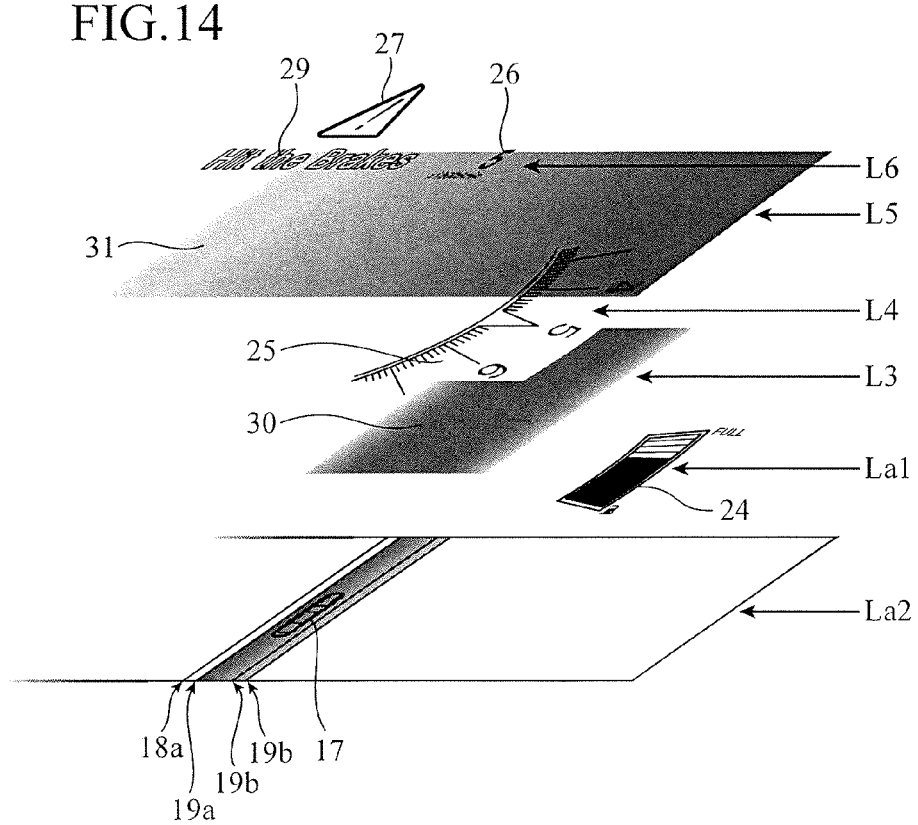
FIG. 14 is a diagram illustrating a layer structure of a display screen in accordance with Embodiment 1.

The display screen 16D may have a plurality of image layers La1, La2 and L3 to L6 as shown in FIG. 14. In this case, it can be configured that, the closer the target vehicle approaches the user's vehicle, the higher is the level of a specific image layer on which the informing processor 15 causes the translucent blur to be displayed in a manner that the level of the specific image layer is lower than or equal to the level of an image layer L6 displaying a predetermined important display item such as the current value 26 of a vehicle's engine speed.

For example, in the traveling state of the target vehicle as shown in FIG. 12, the translucent blur 30 is displayed on the image layer L3 whose level is lower than the level of the image layer L4 displaying the tachometer 25 on the right-hand portion of the display screen 16D and higher than the level of the image layer L2 displaying the residual fuel meter 24. With such a configuration, the translucent blur 30 is displayed as if the translucent blur is projected from under the tachometer 25.

In a state in which the target vehicle further approaches the user's vehicle shown in FIG. 13, the blur 31 is displayed on a higher image layer L5. Note that the level of the higher image layer displaying the blur 31 is not higher than the level of the image layer L6 displaying the current value 26 of the vehicle's engine speed which is the indispensable display item.

Namely, the large-sized blur 31 is displayed on the image screen 16D under the condition that the blur 31 is not displayed on an image layer having a higher level than that of the image layer displaying an important display item such as a vehicle's engine speed or vehicle velocity that is legally required to be displayed. With such an image layer structure, display items that are hidden by the blur 31 can be the fewest possible items.

In the above-mentioned examples, the positional relationship among the target vehicle, the attention zones at both sides of the user's vehicle, and the alert zone has been explained. In another example in which the image 16C of the nearby surroundings of a user's vehicle shows a combination of an alert zone and attention zones at both sides of, in front of and at the back of the user's vehicle, it is possible to determine the traveling state of the target vehicle like the above-mentioned examples.

Figure 15:
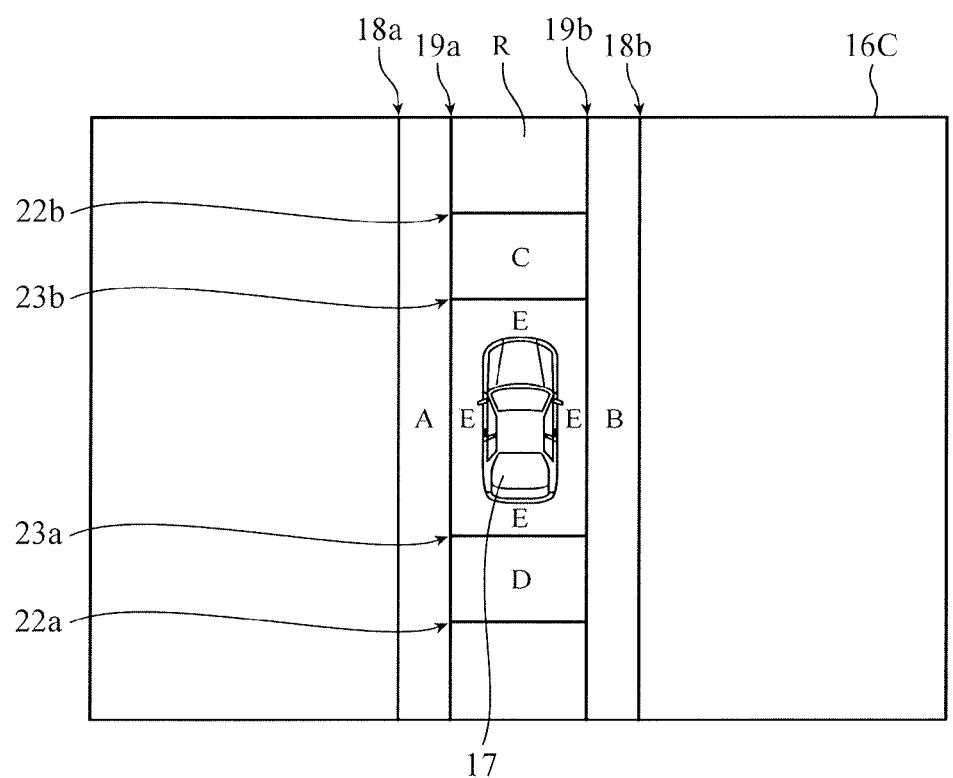
FIG. 15 is a diagram illustrating an exemplary display of ranges of distance set at both sides of, in front of and at the back of the user's vehicle.

FIG. 15 is a diagram illustrating an exemplary display of the ranges of distance set at both sides of, in front of and at the back of the user's vehicle. In FIG. 15, an area A is a region including the attention zone defined by the threshold lines 18a, 19a at the left side of the user's vehicle, and an area B is a region including the attention zone defined by the threshold lines 18b, 19b at the right side of the user's vehicle. A zone C corresponds to the attention zone defined by the threshold lines 22b, 23b in front of the user's vehicle, and a zone D corresponds to the attention zone defined by the threshold lines 22a, 23a at the back of the user's vehicle. A zone E corresponds to the alert zone defined by the threshold lines 19a, 19b, 23a, 23b. Note that the letters "A", "B", "C", "D", and "E" are not displayed in the actual image 16C of the nearby surroundings of the user's vehicle.

Figure 16:
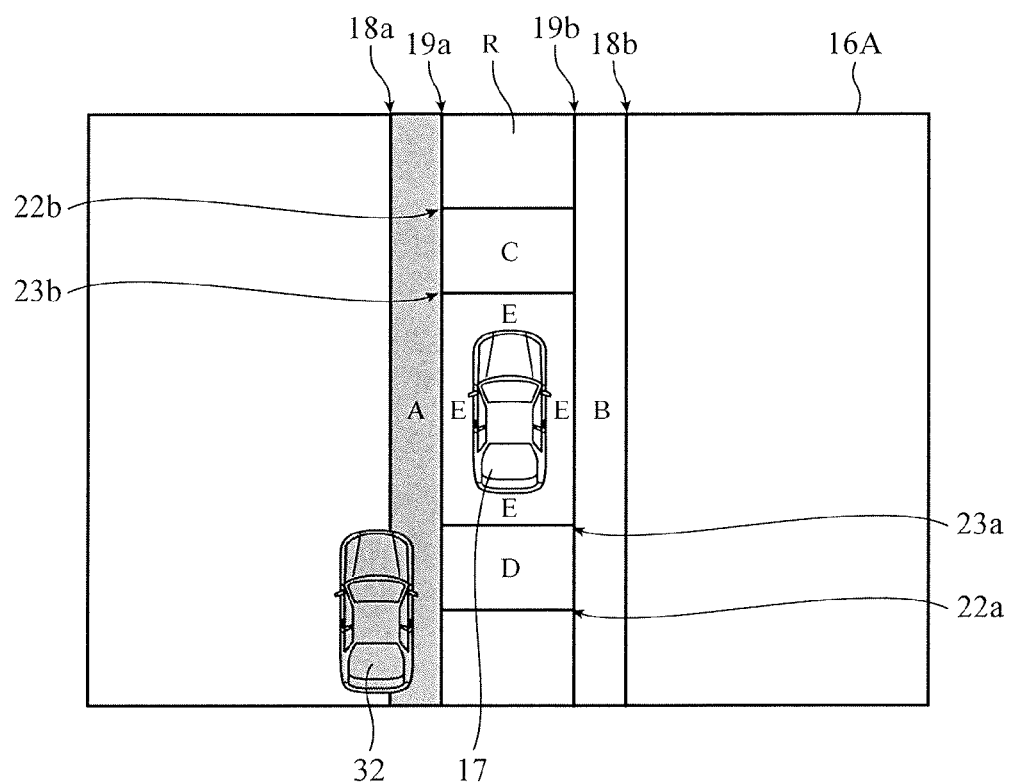
FIG. 16 is a diagram illustrating an exemplary image displayed when another target vehicle moves into an area A.

When the target vehicle indicated by the icon 32 moves into an attention zone from the left side, the informing processor 15 changes the color of the whole area A in the image 16C of the nearby surroundings of the user's vehicle, into yellow that is an attention-drawing color, as shown in FIG. 16. Similarly, when the target vehicle moves into the attention zone D from its rear side, the informing processor 15 changes the color of the attention zone D in the image 16C of the nearby surroundings of the user's vehicle, into yellow, as shown in FIG. 17.

Figure 18:
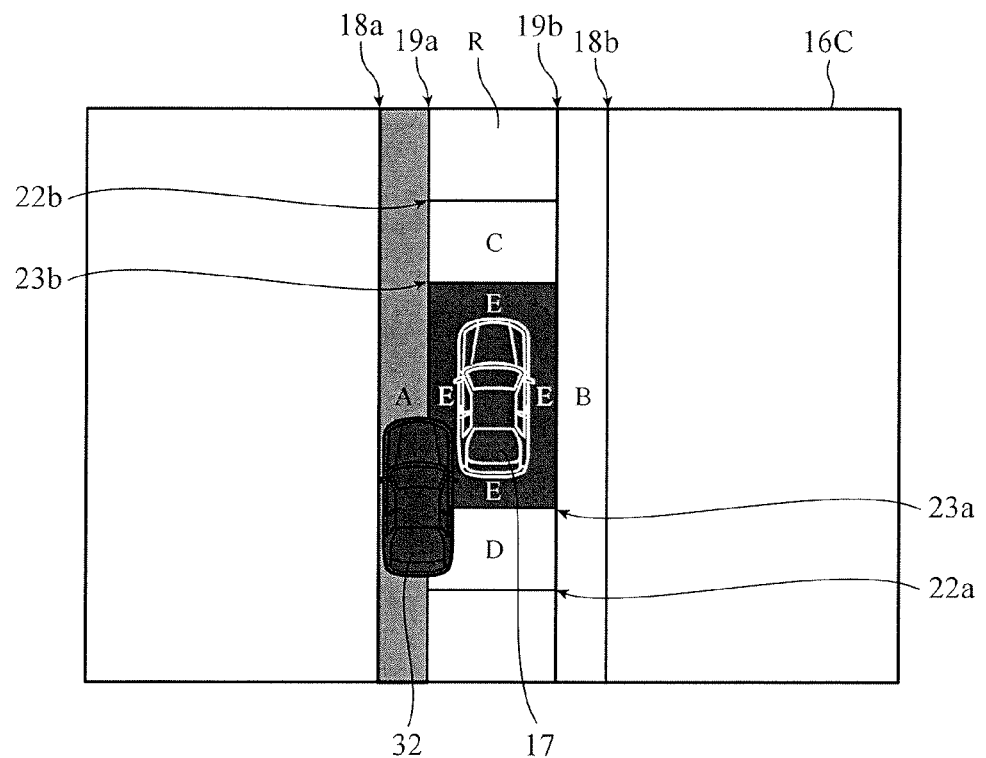
FIG. 18 is a diagram illustrating an exemplary image displayed when another target vehicle moves into a zone E from the area A.
Figure 19:
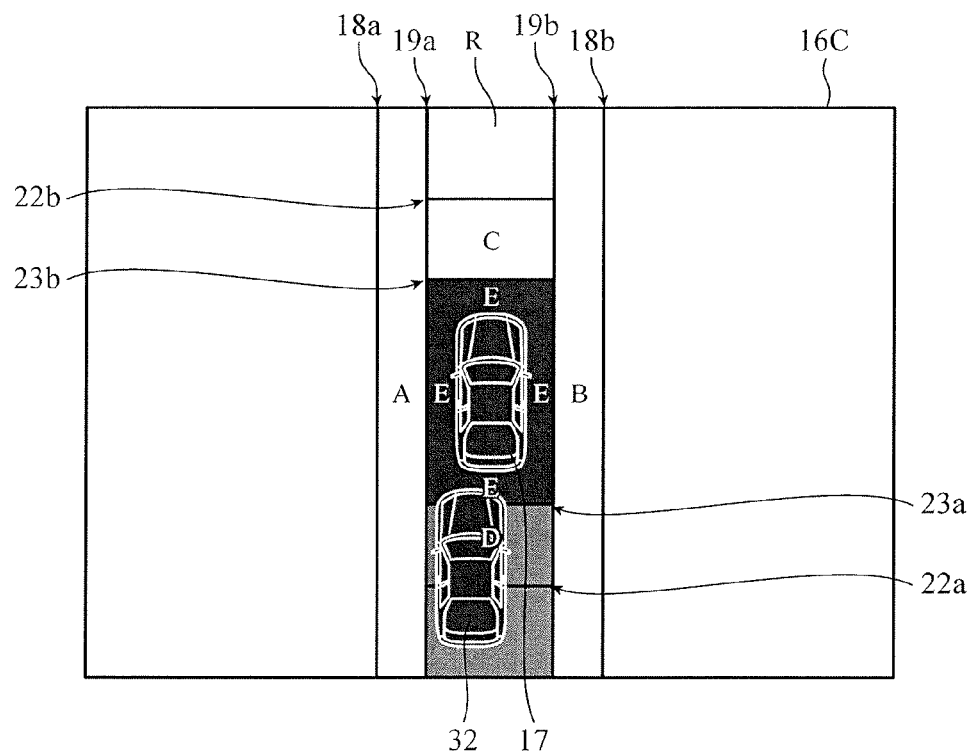
FIG. 19 is a diagram illustrating an exemplary image displayed when another target vehicle moves into the zone E from the zone D.

When the target vehicle passes across the threshold line 19a from the position indicated in shown in FIG. 16, the informing processor 15 changes the color of the alert zone E in the image 16C of the nearby surroundings of the user's vehicle, into red that is an alert color, and changes the color of the area A including the attention zone from which the target vehicle has moved into the alert zone, into pale red, as shown in FIG. 18.

Figure 17:
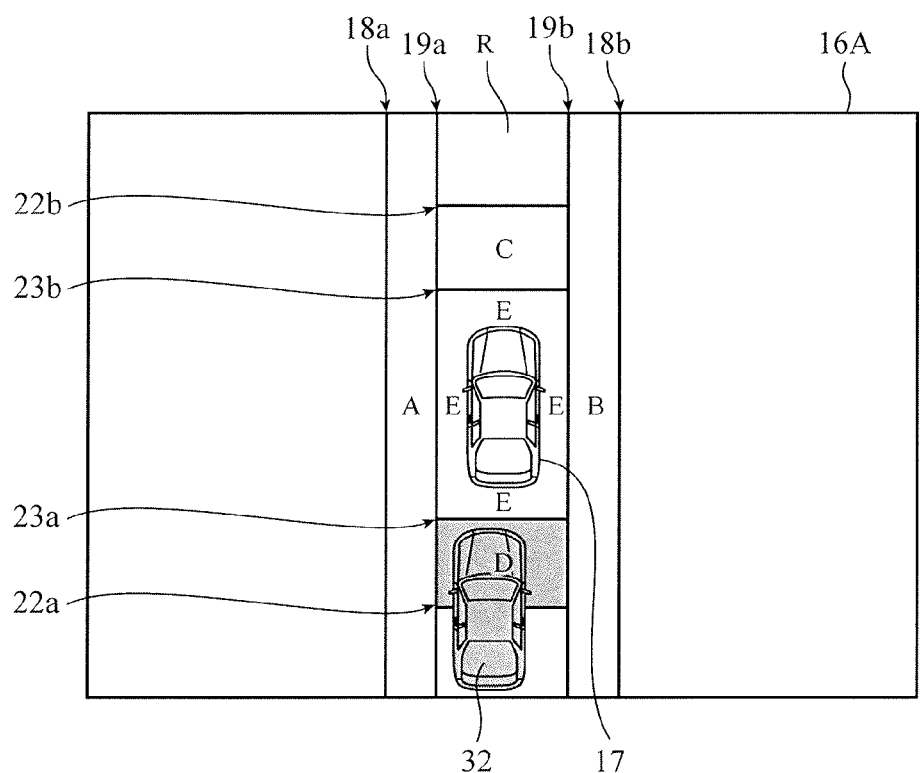
FIG. 17 is a diagram illustrating an exemplary image displayed when another target vehicle moves into a zone D.

Similarly, when the target vehicle passes across the threshold line 23a from a position indicated in shown in FIG. 17, the informing processor 15 changes the color of the alert zone E in the image 16C of the nearby surroundings of the user's vehicle, into red that is the alert color, and changes the color of a rear area including the attention zone D from which the target vehicle has moved into the alert zone, into pale red.

As mentioned above, when the target vehicle moves into an attention zone at the lateral side of, in front of, or at the back of the user's vehicle, the informing processor 15 may change the color of the whole area including the attention zone which is defined by the extending threshold lines. With such a display, the user can easily recognize that the target vehicle approaching to the user's vehicle is present in front of or at the back of the user's vehicle.

When another target vehicle moves from an area at one side of the user's vehicle, into attention zones defined at the side of and at the back of the user's vehicle, or into attention zones defined at the side of and in front of the user's vehicle, the informing processor 15 changes the color of an area including the attention zone close to the area at the side of the user's vehicle from which the target vehicle has moved, into an attention color.

Figure 20:
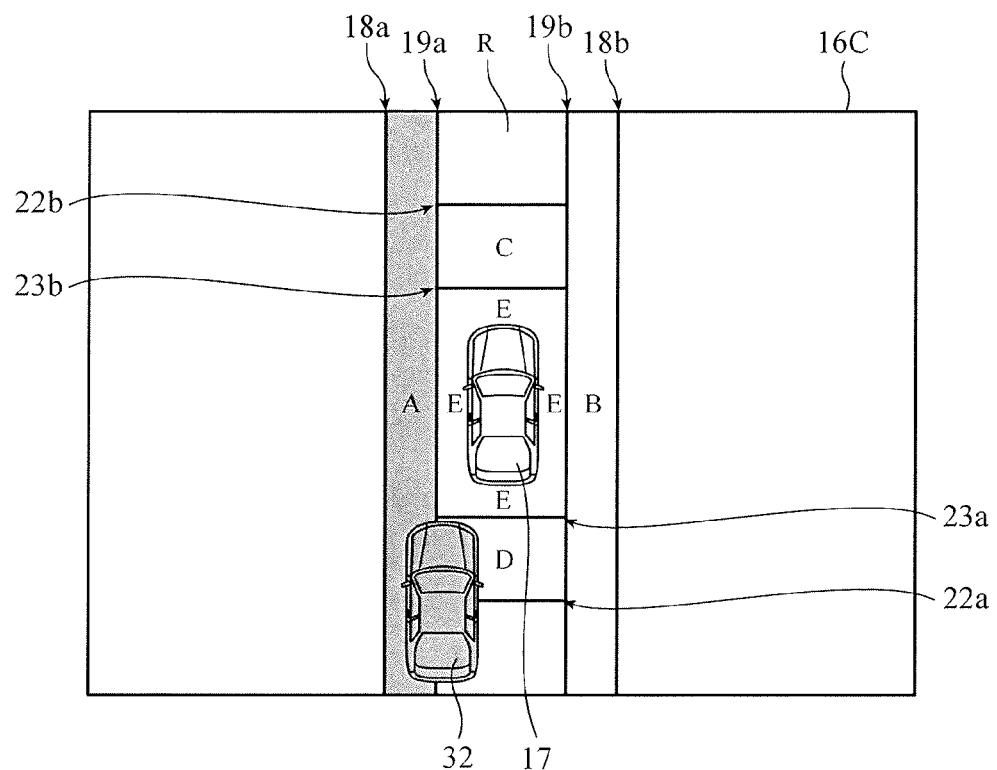
FIG. 20 is a diagram illustrating an exemplary image displayed when another target vehicle moves into the area A and the zone D.

For example, as shown in FIG. 20, when the target vehicle moves, from an area at the left side of the user's vehicle, into attention zones defined at the left side of and at the back of the user's vehicle, the informing processor 15 changes the color of the left side area A including the attention zone at the left side of the user's vehicle into yellow, while the informing processor 15 does not change the color of the attention zone D at the back of the user's vehicle.

Figure 21:
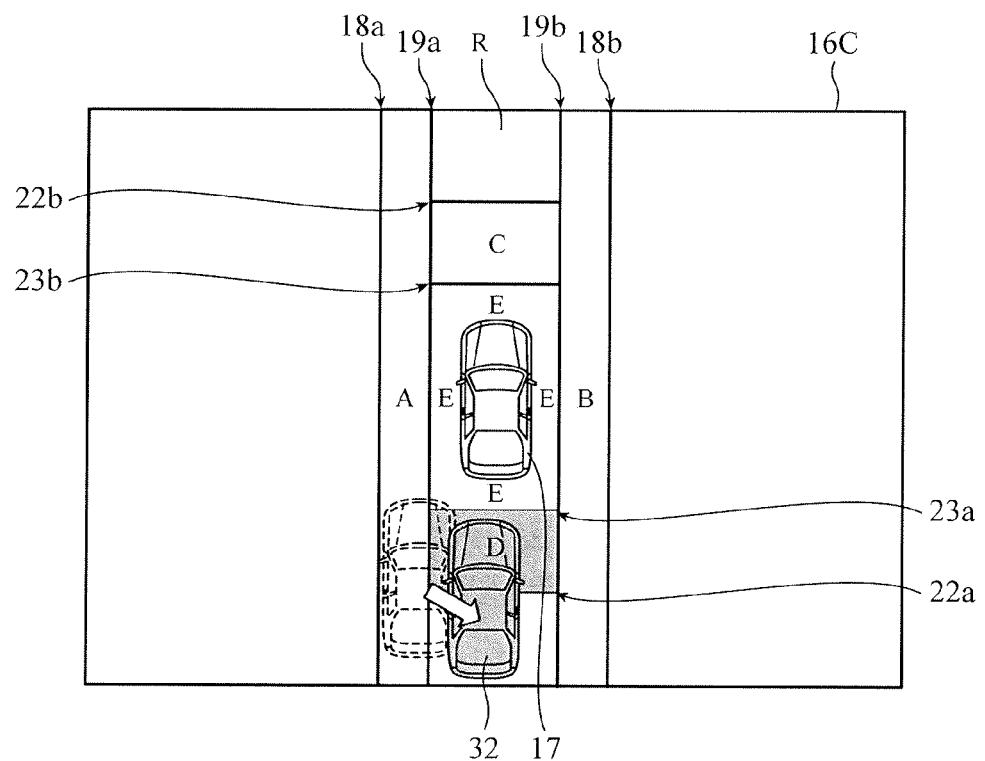
FIG. 21 is a diagram illustrating an exemplary image displayed when another target vehicle moves into the area D from the area A after a state shown in FIG. 20.

When the target vehicle further moves into the attention zone D from the position indicated in FIG. 20, the informing processor 15 changes the color of the left side area A into the default color, and changes the color of the alert zone D into yellow, as shown in FIG. 21. With such a display, the user can easily recognize from which side the target vehicle approaches the user's vehicle.

When two or more other target vehicles move into the attention zone and the alert zone, the informing processor 15 changes the display color of the zone into which each target vehicle moves, or the display colors of both an image of each target vehicle and the zone into which the target vehicle moves, into a display color corresponding to the zone into which each target vehicle moves.

Figure 22:
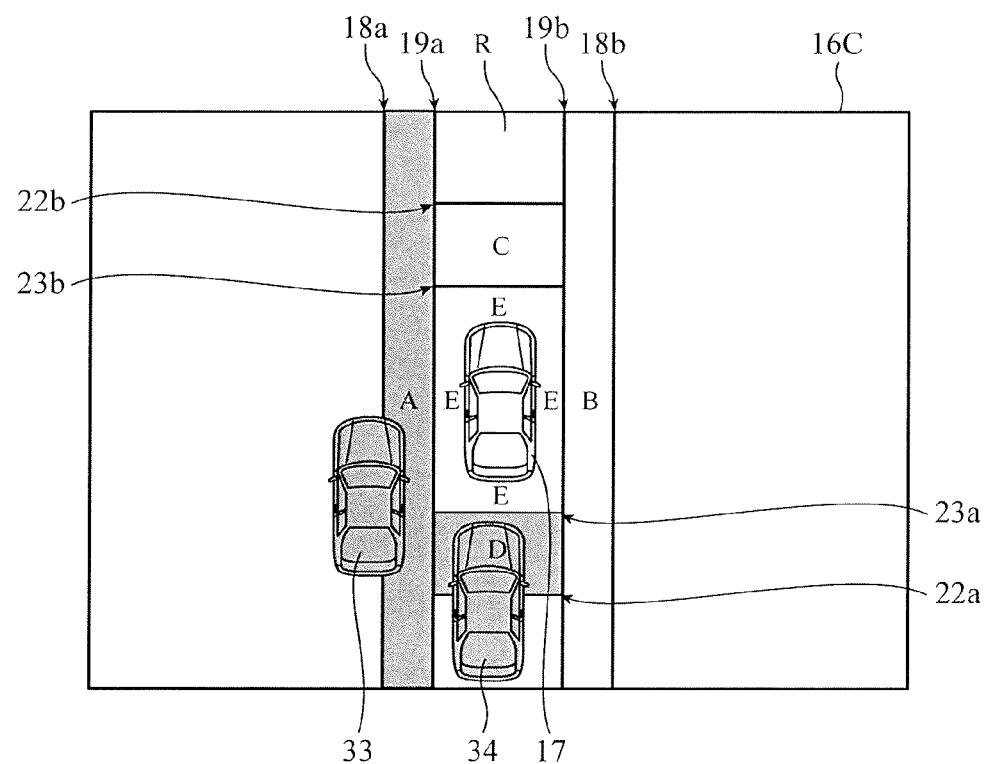
FIG. 22 is a diagram illustrating an exemplary image displayed when two other target vehicles move into the area A and the zone D, respectively.

For example, as shown in FIG. 22, there is a case where target vehicles indicated by the icons 33 and 34 move into an area A including an attention zone at the left side of the user's vehicle, and an alert zone D at the back of the user's vehicle, respectively. In this case, the informing processor 15 changes the colors of the area A the attention zone D into yellow that is a color corresponding to the attention zone.

Figure 23:
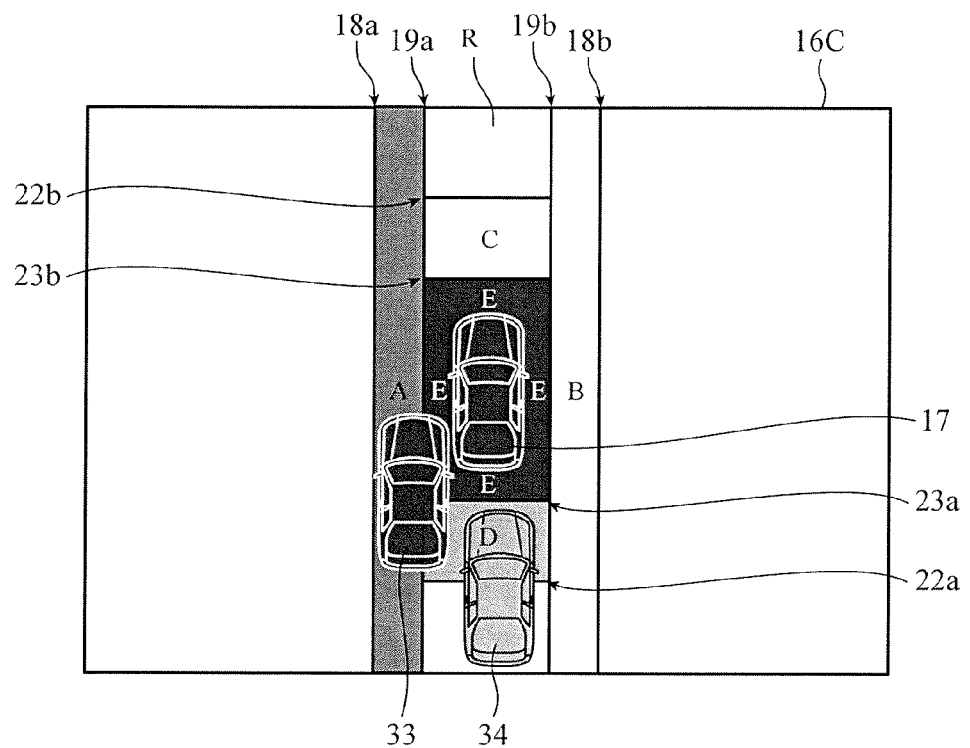
FIG. 23 is a diagram illustrating an exemplary image displayed when one target vehicle moves into the zone E from the area A after the state shown in FIG. 22.

When one target vehicle further moves into the alert zone E from the position indicated in FIG. 22, as shown in a display pattern corresponding to alert zones of FIG. 23, the informing processor 15 changes the color of the alert zone E into red, and changes the color of the area A into pale red.

As explained above, even in the case where the two or more target vehicles exist, the display color of the nearby zone in the direction along which each target vehicle approaches is changed into a color depending on the degree of closeness in distance between the user's vehicle and each target vehicle. Therefore, the user can recognize the degree of closeness in distance for each of the target vehicles, on the basis of the change of the display color.

Moreover, the informing processor 15 displays, on the display, the image of the nearby surroundings of the user's vehicle including a plan-view image or bird's-eye-view image of both the user's vehicle and the target vehicle. Thereby, it is possible to clearly display a positional relationship between the user's vehicle and the target vehicle.

In generating the image of the nearby surroundings of a user's vehicle, as the target vehicle approaches the user's vehicle, the informing processor 15 may move a location of a viewpoint from which the user's vehicle is viewed in the plan-view or the bird's-eye-view, closer to the user's vehicle.

For example, when the positional relationship between the user's vehicle and the target vehicle is in a safe state, the location of the viewpoint is set at the farthest position from the user's vehicle in a vertical direction. FIG. 24A illustrates the image 16E of the nearby surroundings of a user's vehicle when viewed from the farthest viewpoint.

When the target vehicle indicated by an icon 35 approaches the user's vehicle from the position indicated in FIG. 24A, giving rise to an attention-requiring state, the location of the viewpoint is moved closer to the user's vehicle from its location in the safe state. FIG. 24B illustrates the image 16F of the nearby surroundings of a user's vehicle when viewed from that viewpoint. In the image 16F of the nearby surroundings of the user's vehicle, the icon 17 indicating the user's vehicle and the icon 35 indicating the target vehicle are enlarged as compared to those in the safe state.

When the target vehicle indicated by the icon 35 further approaches the user's vehicle, giving rise to an alert state, the location of the viewpoint is moved closer to the user's vehicle from its location in the attention-requiring state.

FIG. 24C illustrates the image 16G of the nearby surroundings of the user's vehicle when viewed from that viewpoint. In the image 16G of the nearby surroundings of the user's vehicle, the icon 17 indicating the user's vehicle and the icon 35 indicating the target vehicle are enlarged for display as compared to those in the attention-requiring state.

As mentioned above, as the target vehicle approaches the user's vehicle, the informing processor moves the location of the viewpoint from which the user's vehicle is viewed in the plan-view or the bird's-eye-view, closer to the user's vehicle. Thereby, it is possible to display the positional relationship between the user's vehicle and the target vehicle in an expanded manner such that the user can easily recognize the positional relationship.

In generating the image of the nearby surroundings of the user's vehicle, as the target vehicle approaches the user's vehicle, the informing processor 15 may move, in the horizontal direction, the location of the viewpoint from which the user's vehicle is viewed in the plan-view or the bird's-eye-view such that the image of the nearby surroundings of the user's vehicle shows the target vehicle.

For example, when the positional relationship between the user's vehicle and the target vehicle is in the safe state or when the target vehicle is not present around the user's vehicle, the location of the viewpoint is set just above the user's vehicle. FIG. 25B illustrates the image 16I of the nearby surroundings of a user's vehicle when viewed from that viewpoint.

When the target vehicle moves into the attention zone arranged in front of the user's vehicle from the position indicated in FIG. 25B, the informing processor 15 moves the location of the viewpoint forward in the horizontal direction. FIG. 25A illustrates the image 16H of the nearby surroundings of the user's vehicle when viewed from such a viewpoint. By moving the viewpoint from which the user's vehicle is viewed, forward in the horizontal direction, the icon 17 indicating the user's vehicle is arranged at the center of the image 16H of the nearby surroundings of the user's vehicle, and the icon 35 indicating the target vehicle is arranged ahead of the icon 17.

When the target vehicle moves into the attention zone arranged at the back of the user's vehicle from the position indicated in FIG. 25B, the informing processor 15 moves the viewpoint backward in the horizontal direction. FIG. 25C illustrates the image 16J of the nearby surroundings of the user's vehicle when viewed from such a viewpoint. By moving the viewpoint from which the user's vehicle is viewed, backward in the horizontal direction, the icon 17 indicating the user's vehicle is arranged at the center of the image 16J of the nearby surroundings of the user's vehicle, and the icon 35 indicating the target vehicle is arranged at the rear side of the icon 17.

In FIG. 25A and FIG. 25C, a case in which the viewpoint is moved forward or backward is illustrated. Alternatively, the viewpoint may be moved in a left or right direction when the target vehicle approaches the user's vehicle from the left or right side.

As mentioned above, as the target vehicle approaches the user's vehicle, the informing processor moves, in the horizontal direction, the location of the viewpoint from which the user's vehicle is viewed in the plan-view or the bird's-eye-view such that the image of the nearby surroundings of the user's vehicle shows the target vehicle. Thereby, it is possible to appropriately display the target vehicle approaching to the user's vehicle in the image of the nearby surroundings of the user's vehicle.

In generating the image of the nearby surroundings of the user's vehicle, the informing processor 15 may move the viewpoint in the vertical direction as well as in the horizontal direction. Thereby, it is possible to appropriately display the target vehicle approaching to the user's vehicle in the image of the nearby surroundings of the user's vehicle in an expanded manner.

In Embodiment 1, a case has been described where the distance state calculator 13 performs a calculation on the basis of the measurement information obtained by the distance determiner 12 to thereby acquire the positional relationship between the moving object and the one or more ranges of distance from the user's vehicle in each of which a notification of approach of the moving object is to be provided. Nonetheless, the invention is not limited to the case in which the distance state calculator 13 itself calculates the above-mentioned positional relationship.

Namely, the distance state calculator 13 can also function as an acquiring unit in the invention, and may be configured to acquire the positional relationship by receiving information on the positional relationship between the moving object and the one or more ranges of distance from the user's vehicle in each of which a notification of approach of the moving object, from an external device that has been calculated the positional relationship.

In this case, the driving support apparatus 1 may not have the vehicle detector 11 and the distance determiner 12. In addition, when the informing processor 15 generates a predetermined image as the icon of a moving object regardless of the type of the moving object, the driving support apparatus 1 may not have the vehicle type identifier 14.

As mentioned above, the driving support apparatus according to Embodiment 1 includes at least the distance state calculator 13 and the informing processor 15.

The distance state calculator 13 determines the positional relationship between another target vehicle and the attention and alert zones that are the ranges of distance from the user's vehicle in each of which a notification of approach of the moving object is to be provided. The informing processor 15 causes the display to display the image of the nearby surroundings of the user's vehicle including the images of the user's vehicle and threshold lines defining the range of distance, and changes the image of the nearby surroundings of the user's vehicle in accordance with the positional relationship acquired by the distance state calculator 13. As mentioned above, in Embodiment 1, the image of the nearby surroundings of the user's vehicle including the images of the user's vehicle and threshold lines defining the range of distance is displayed on the display device, and the image of the nearby surroundings of the user's vehicle is changed in accordance with the positional relationship between the moving object and the attention and alert zones.

Thereby, the user can intuitively recognize the situation of the user's vehicle and the situation around the user's vehicle.

According to Embodiment 1, the informing processor 15 causes the image of the moving object to appear in the image of the nearby surroundings of the user's vehicle, in accordance with the above-mentioned positional relationship acquired by the distance state calculator 13.

Thereby, the user can intuitively recognize the positional relationship between the user's vehicle and the moving object around the user's vehicle.

According to Embodiment 1, the driving support apparatus includes the vehicle type identifier 14 that determines the type of the target vehicle detected by the vehicle detector 11, and the informing processor 15 causes the image of the target vehicle corresponding to the type which is determined by the vehicle type identifier 14, to appear in the image of the nearby surroundings of the user's vehicle.

In this manner, since the informing processor automatically displays the image corresponding to the type which is determined by the vehicle type identifier 14, as the image of the target vehicle, the user can intuitively recognize the target vehicle.

According to Embodiment 1, the ranges of distance from the user's vehicle, such as the attention zone and the alert zone, are set at different regions depending upon distances from the user's vehicle.

When the target vehicle moves into one or more ranges of distance, the informing processor 15 changes the display colors of the one or more ranges of distance or the display colors of both the image of the target vehicle and the one or more ranges of distance, into a display color in a manner that the display color of the alert zone which is a close range of distance from the user's vehicle is different from the display color of the attention zone which is a far range of distance from the user's vehicle. Thereby, the user can intuitively recognize that the target vehicle approaches the user's vehicle at what range of distance, on the basis of the change of the displayed color.

According to Embodiment 1, when two or more target vehicles move into their respective different ranges of distance at the same time, the informing processor 15 changes the display colors of the ranges of distance into which their respective target vehicles move, or the display colors of both an image of their respective target vehicles and the corresponding ranges of distance into which their respective target vehicles move, into display colors corresponding to the ranges of distance into which their respective target vehicles move. In the case where such two or more target vehicles exit, the display color of the range of distance in the direction along which each target vehicle approaches the user's vehicle is changed into the color corresponding to the degree of closeness in distance between those vehicles. Therefore, the user can recognize the degree of closeness in distance for each of the two or more target vehicles, on the basis of the change of the display color.

According to Embodiment 1, when the target vehicle moves into the attention zone, the informing processor 15 changes the color of the attention zone or the colors of both the image of the target vehicle and the attention zone, into an attention-drawing color. When the target vehicle moves from the attention zone into the alert zone closer to the user's vehicle, the informing processor 15 changes the color of the alert zone or the colors of both the image of the target vehicle and the alert zone, into an alert color, and also changes the color of the attention zone through which the target vehicle moves into the alert zone, into a different alert color that differs in tone from the alert color.

In this case, the color of the alert zone is changed into the alert color, and the color of the attention zone through which the target vehicle moves into the alert zone is also changed into the different alert color resembling the alert color. Thereby, the user can easily recognize the direction from which the target vehicle approaches the user's vehicle, on the basis of the stepwise color change.

According to Embodiment 1, when the target vehicle moves into the range of distance, the informing processor 15 causes the display screen 16D of the display for displaying the image of the nearby surroundings of the user's vehicle, to display the translucent blur 30 with a predetermined color on an area corresponding to the direction from which the target vehicle approaches the user's vehicle. The informing processor 15 also changes the translucent blur 30 into another blur 31, and enlarges the size of the area displaying the blur as the target vehicle approaches the user's vehicle. Thereby, the user can easily recognize the direction from which the target vehicle approaches the user's vehicle, on the basis of the translucent blur 30 and the blur 31, when the user glances at the display screen 16D.

According to Embodiment 1, the display screen 16D of the display has the plurality of image layers. In this case, the closer the target vehicle approaches the user's vehicle, the higher is the level of the image layer on which the informing processor 15 causes the blur to appear in a manner that the level of the image layer is lower than or equal to the level of another image layer which displays a predetermined important display item such as the current value 26 of a vehicle's engine speed. Thereby, display items that are hidden by the blur can be the fewest possible items.

According to Embodiment 1, the image 16A of the nearby surroundings of the user's vehicle shows the threshold lines 18a, 19a, 18b, 19b, which define the attention zones at both sides of the user's vehicle as the ranges of distance as well as define the alert zone as another range of distance. The threshold lines 18a, 19a, 18b, 19b are displayed so as to extend along the road R on which the user's vehicle is traveling.

When the target vehicle moves into the range of distance arranged in front of, at the back of or at one side of the user's vehicle, the informing processor 15 changes the color of the area including at least one of the ranges of distance that is defined by the extending threshold lines.

Thereby, the user can easily recognize that the target vehicle approaching to the to user's vehicle is in front of or at the rear side of the user's vehicle.

According to Embodiment 1, when the target vehicle moves into the range of distance, the informing processor 15 changes the contents and sizes of the mark and displayed letters which are associated with drawing of attention of the user in a manner that the contents and sizes differ between the attention zone that is a far range of distance from the user's vehicle, and the alert zone that is a close range of distance from the user's vehicle. Thereby, the user can intuitively recognize how close the target vehicle is to the user's vehicle, on the basis of the contents of the mark and displayed letters.

According to Embodiment 1, the informing processor 15 displays, on the display, the image of the nearby surroundings of the user's vehicle including one of the plan-view image of both the user's vehicle and the target vehicle and the bird's-eye-view image of both the user's vehicle and the target vehicle. Thereby, it is possible to clearly display the positional relationship between the user's vehicle and the target vehicle.

According to Embodiment 1, as the target vehicle approaches the user's vehicle, the informing processor 15 moves the location of the viewpoint from which the user's vehicle is viewed in the plan-view or the bird's-eye-view, closer to the user's vehicle.

Thereby, it is possible to display the positional relationship between the user's vehicle and the target vehicle in the expanded manner such that the user can easily recognize the positional relationship.

According to Embodiment 1, the informing processor 15 moves the location of the viewpoint from which the user's vehicle is viewed in the plan-view or the bird's-eye-view in the horizontal direction such that the image of the nearby surroundings of the user's vehicle shows the target vehicle as the target vehicle approaches the user's vehicle. Thereby, it is possible to appropriately display the target vehicle approaching to the user's vehicle in the image of the nearby surroundings of the user's vehicle.

Embodiment 2

Figure 26:
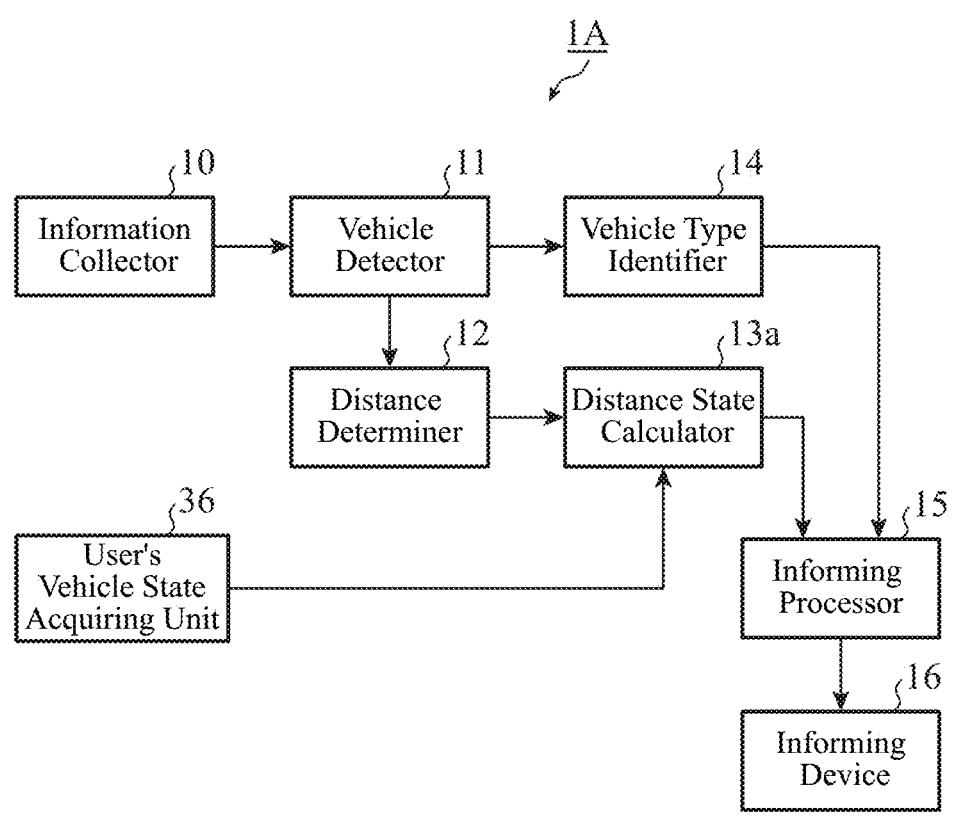
FIG. 26 is a block diagram illustrating a configuration of a driving support apparatus in accordance with Embodiment 2.

FIG. 26 is a block diagram illustrating a configuration of a driving support apparatus 1A in accordance with Embodiment 2. In FIG. 26, the driving support apparatus 1A is an apparatus that informs a user of the approach of a moving object such as another vehicle to a user's vehicle. The driving support apparatus 1A includes the information collector 10, the vehicle detector 11, the distance determiner 12, a distance state calculator 13a, the vehicle type identifier 14, the informing processor 15, the informing device 16 and a user's vehicle state acquiring unit 36.

Among components of the driving support apparatus 1A, the vehicle detector 11, the distance determiner 12, the distance state calculator 13a, the vehicle type identifier 14, the informing processor 15, and the user's vehicle state acquiring unit 36 are constituted by a processor 100 such as a system LSI (Large-Scale Integrated Circuit) or a Central Processing Unit (CPU) that executes a program stored in the memory 101

The informing processor 15 causes display of both an image indicating the driving maneuver that is determined by the distance state calculator 13a as a maneuver requiring the attention, and display of items associated with drawing of the attention, to appear in the image of the nearby surroundings of the user's vehicle.

Next, operations will be described.

Figure 27:
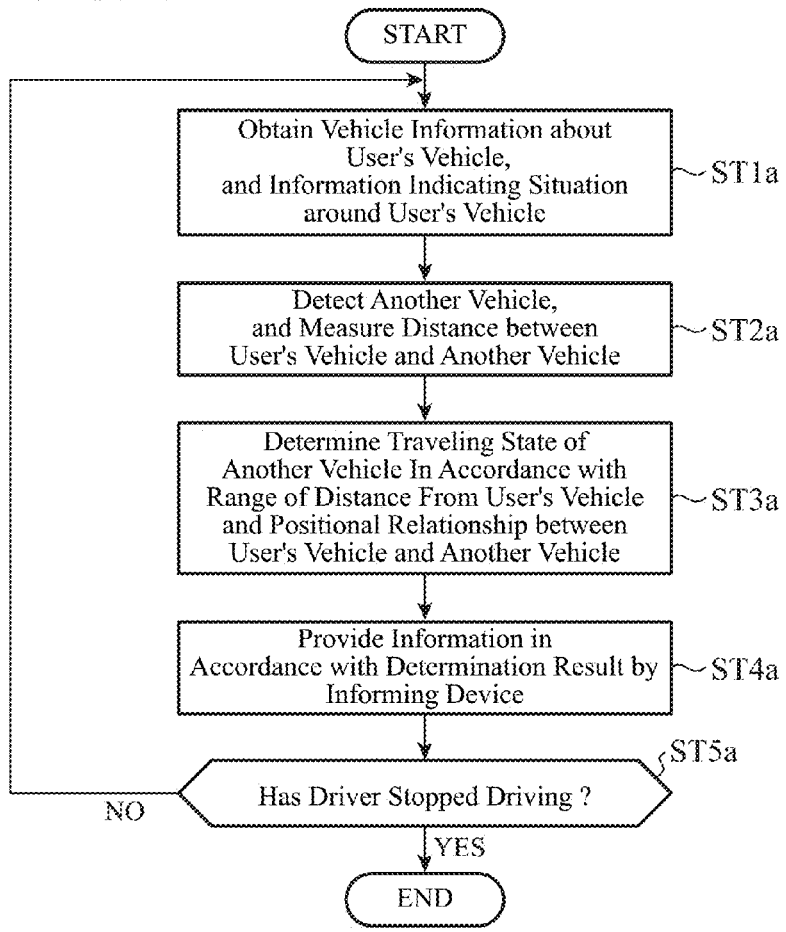
FIG. 27 is a flowchart illustrating operations of the driving support apparatus in accordance with Embodiment 2.

FIG. 27 is a flowchart illustrating operations of the driving support apparatus in accordance with Embodiment 2, and indicating operations in which the driving support apparatus informs the user of the approach of the target vehicle to the user's vehicle.

In FIG. 27, processes in Step ST1a to Step ST4a are consecutively and repeatedly executed until a user of the user's vehicle finishes driving.

In Step ST1a, the information collector 10 monitors the situation around the user's vehicle, and obtains the information indicating the situation around the user's vehicle.

When the information collector 10 cannot obtain the information about the road on which the user's vehicle is traveling, the user's vehicle state acquiring unit 36 acquires, from an external device, the information about the lane width of the traffic route on which the user's vehicle is traveling. At the same time, the user's vehicle state acquiring unit 36 also acquires the vehicle information on the driving maneuver of the user's vehicle.

In Step ST2, the vehicle detector 11 receives the information indicating the situation around the user's vehicle obtained in real-time by the information collector 10 as similar with Step ST2 shown in FIG. 2, and, among the received information, identifies information on the moving object and information on the stationary object.

After identifying the information on the moving object among the information indicating the situation around the user's vehicle, the vehicle detector 11 outputs the information on the moving object to the distance determiner 12 and the vehicle type identifier 14.

The distance determiner 12 extracts information corresponding to the relative location of the moving object with respect to the user's vehicle from among the information on the moving object. Then, the distance determiner 12 determines the distance between the moving object and the user's vehicle in accordance with the information corresponding to the relative location.

Note that the determination of the distance between the moving object and the to user's vehicle is continuously and repeatedly executed for the moving object identified by the vehicle detector 11. The distance determiner 12 outputs the distance between the moving object and the user's vehicle to the distance state calculator 13a one after another.

The vehicle type identifier 14 extracts the appearance information of the moving object from among the information on the moving object identified by the vehicle detector 11. Then, the vehicle type identifier 14 identifies the type of the moving object based on the appearance information.

In Step ST3a, the distance state calculator 13a performs a calculation on the basis of both the measurement information obtained by the distance determiner 12 and the information about the lane width of the traffic route on which the user's vehicle is traveling, received by the user's vehicle state acquiring unit 36, to thereby acquire the positional relationship between the moving object and the one or more ranges of distance from the user's vehicle in each of which a notification of approach of the moving object is to be provided.

Further, the distance state calculator 13a determines whether to draw the attention of the user about the driving maneuver of the user's vehicle indicated by the vehicle information in accordance with both the vehicle information on the driving maneuver of the user's vehicle received by the user's vehicle state acquiring unit 36 and the positional relationship between the range of distance from the user's vehicle and the target vehicle. For example, when the driving maneuver of the user's vehicle corresponds to the operation to activate the blinker, the distance state calculator 13a determines whether to prompt the attention of the user about the driving maneuver in accordance with both the positional relationship between the user's vehicle and the target vehicle approaching to the user's vehicle and a direction indicated by the blinker.

Figure 28:
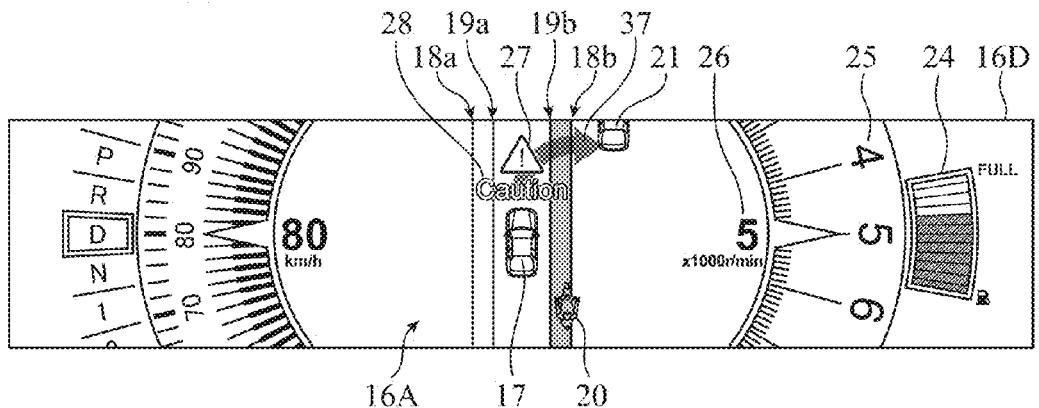
FIG. 28 is a diagram illustrating an exemplary image displayed in accordance with Embodiment 2.

In Step ST4a, the informing processor 15 causes both the image indicating the driving maneuver and the display item associated with drawing of the attention of the user, to appear in the image of the nearby surroundings of the user's vehicle when the distance state calculator 13a determines that the driving maneuver is a maneuver requiring attention. For example, in a case where the operation to activate a right blinker for the right-turn is executed when the target vehicle approaches the user's vehicle from the right such that the driving state of the target vehicle becomes in the attention-requiring state, the informing processor 15 causes an arrow 37 indicating the right-turn to appear in the image 16A of the nearby surroundings of the user's vehicle as shown in FIG. 28, and causes the display item prompting the attention of the user to appear in the image 16A of the nearby surroundings of the user's vehicle. In this case, the items drawing the attention of the user are the attention mark 27 and the letters 28 of "Caution".

Thereby, the user can intuitively recognize that the driving maneuver corresponding to the right-turn of the user's vehicle is a driving maneuver requiring attention about the target vehicle indicated by the icon 20. In the above-mentioned example, the driving maneuver corresponding to the right turn is explained. This embodiment is also applicable to the driving maneuver corresponding to the-left turn.

The processes in Step ST1a to Step ST4a are continuously and repeatedly executed.

When the user drives the user's vehicle (NO in Step ST5a), the process returns to Step ST1a and a series of processes in Step ST1a to Step ST4a is repeatedly executed.

On the other hand, when the user stops driving the user's vehicle (YES in Step ST5a), a series of processes in Step ST1a to Step ST4a is terminated.

Note that the stop of driving corresponds to, for example, a state in which a drive portion such as an engine of the user's vehicle is stopped and power supply to electrical components of the user's vehicle is stopped.

Note that some processes explained in Embodiment 1 and some processes explained in Embodiment 2 can be concurrently executed. For example, even if the information collector 10 can obtain the information indicating the nearby surroundings of the user's vehicle, including the white lines at both sides of the lane, the user's vehicle state acquiring unit 36 also obtains the existing road data about the road on which the user's vehicle is traveling. Thereby, the distance state calculator 13a can obtain more accurate road information by using a combination of the information obtained by the information collector 10 and the information obtained by the user's vehicle state acquiring unit 36.

Moreover, the distance state calculator is always able to determine the positional relationship between the range of distance from the user's vehicle and the target vehicle. Thus, when the user tries to, for example, perform the lane change of the user's vehicle or turn the user's vehicle to the right or left, the distance state calculator can always determine whether to prompt the attention of the user such that the user can recognize the approach of the target vehicle to the user's vehicle.

In Embodiment 2, a case has been described where the distance state calculator 13a performs a calculation on the basis of the measurement information obtained by the distance determiner 12 to thereby acquire the positional relationship between a moving object and the one or more ranges of distance from the user's vehicle in each of which a notification of the approach of the moving object is to be provided. Nonetheless, the invention is not limited to the case in which the distance state calculator 13*a* itself calculates the above-mentioned positional relationship.

Namely, the distance state calculator 13*a* can function as an acquiring unit in the invention, similarly to Embodiment 1, and may be configured to acquire the positional relationship by receiving information on the positional relationship between the moving object and the range of distance in which a notification of the approach of the moving object is to be provided, from an external device that has been calculated the positional relationship.

In this case, the driving support apparatus 1A may not have the vehicle detector 11 and the distance determiner 12. In addition, when the informing processor generates a predetermined image as the icon of the moving object regardless of the type of the moving object, the driving support apparatus 1A may not have the vehicle type identifier 14.

As described above, according to Embodiment 2, the informing processor 15 causes the image indicating the driving maneuver requiring attention and the display item prompting the attention, to appear in the image of the nearby surroundings of the user's vehicle.

Thereby, the user can intuitively recognize whether the driving maneuver of the user's vehicle requires the attention because the target vehicle approaches the user's vehicle.

According to Embodiment 2, the distance state calculator 13*a* performs a calculation to acquire the positional relationship between another vehicle and the range of distance from the user's vehicle by using at least one of the detected information about the road on which the user's vehicle is traveling and the existing road data about the road on which the user's vehicle is traveling. Thereby, even if the information collector 10 is not able to obtain the information about the road on which the user's vehicle is traveling, the distance state calculator can calculate the positional relationship based on the existing road data.

In this disclosure, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

When a driving support apparatus according to this disclosure is used, a user can intuitively recognize a positional relationship between a user's vehicle and a moving object around the user's vehicle. Thus, the driving support apparatus according to this disclosure is suitable for supporting a driving maneuver to avoid contact or collision between the user's vehicle and the moving object.

REFERENCE SIGNS LIST

1A: driving support apparatus; 10: information collector; 11: vehicle detector; 12: distance determiner; 13, 13*a*: distance state calculator; 14: vehicle type identifier; 15: informing processor; 16: informing device; 16A to 16C, 16E to 16J: images of nearby surroundings of a user's vehicle; 16D: display screen; 17: user's vehicle; 18*a*, 18*b*, 19*a*, 19*b*, 22*a*, 22*b*, 23*a*, 23*b*: threshold line; 20, 21, 32, 33, 34, 35: other vehicles; 24: residual fuel meter; 25: tachometer; 26: a current value of speed at which engine of user's vehicle turns; 27: attention mark; 28, 29: letters; 30, 31: blur; 36: user's vehicle state acquiring unit; and 37: arrow.

The invention claimed is:

1. A driving support apparatus comprising:
   a processor to execute a program; and
   a memory to store therein the program which, when executed by the processor, causes the processor to perform operations comprising:
   acquiring a positional relationship between at least one moving object and one or more different ranges of distance from a user's vehicle, each of the one or more ranges of distance being a range in which a notification of approach of the moving object to the user's vehicle is to be provided;
   causing a display device to display an image of nearby surroundings of the user's vehicle including images of the user's vehicle, and
   threshold lines that define the one or more ranges of distance;
   causing both an image indicating a driving maneuver which requires attention of a user driving the user's vehicle and a display item associated with drawing of the attention, to appear within the image of nearby surroundings of the user's vehicle; and
   changing the image of nearby surroundings of the user's vehicle in accordance with the acquired positional relationship.

2. The driving support apparatus according to claim 1, wherein the operations further comprise causing an image of the moving object to appear within the image of nearby surroundings of the user's vehicle, in accordance with the acquired positional relationship.

3. The driving support apparatus according to claim 2, wherein the operations further comprise:
   determining a type of the moving object; and
   causing the image of the moving object corresponding to the determined type to appear within the image of nearby surroundings of the user's vehicle.

4. The driving support apparatus according to claim 3, wherein the operations further comprise, when the moving object moves into a one of the different ranges of distance, changing a size and contents of a display item associated with drawing of attention of the user, in a manner that a size and contents corresponding to the different range of distance close to the user's vehicle are different from a size and contents corresponding to another range of distance which is farther from the user's vehicle than the different range of distance close to the user's vehicle.

5. The driving support apparatus according to claim 2, wherein the operations further comprise causing the display device to display the image of nearby surroundings of the user's vehicle representing a plan-view image of both the user's vehicle and the moving object or a bird's-eye-view image of both the user's vehicle and the moving object.

6. The driving support apparatus according to claim 5, wherein the operations further comprise, as the moving object approaches the user's vehicle, moving a location of a viewpoint from which the user's vehicle is viewed in a plan-view or a bird's-eye-view, closer to the user's vehicle.

7. The driving support apparatus according to claim 5, wherein the operations further comprise, as the moving object approaches the user's vehicle, moving, in a horizontal direction, a location of a viewpoint from which the user's vehicle is viewed in a plan-view or a bird's-eye-view such that the image of nearby surroundings of the user's vehicle shows the moving object.

8. The driving support apparatus according to claim 1, wherein:
the one or more different ranges of distance are to depend upon a distance from the user's vehicle; and
the operations further comprise, when the moving object moves into the one or more ranges of distance, changing display colors of the one or more ranges of distance or display colors of both an image of the moving object and the one or more ranges of distance in a manner that a display color of a close range of distance is different from a display color of another range of distance which is farther from the user's vehicle than said close range of distance.

9. The driving support apparatus according to claim 8, wherein the operations further comprise, when the moving object moves into an area that is one of the different ranges of distance, changing a display color of said area of the different ranges of distance, or display colors of both an image of the moving object and said area of the different ranges of distance, into a color identifying said area of the different ranges of distance.

10. The driving support apparatus according to claim 8, wherein the operations further comprise:
when the moving object moves into a first range of distance, changing a display color of the first range of distance or display colors of both an image of the moving object and the first range of distance, into a first display color; and
when the moving object moves into a second range of distance being closer to the user's vehicle than the first range of distance, changing a display color of the second range of distance or display colors of both an image of the moving object and the second range of distance, into a second display color being different from the first display color, while changing the display color of the first range of distance through which the moving object moves into the second range of distance, into the second display color that differs from the first display color.

11. The driving support apparatus according to claim 1, wherein the operations further comprise:
when the moving object moves into a one of said different ranges of distance, causing the display device to display, in a display screen displaying the image of nearby surroundings of the user's vehicle, a translucent blur with a color on an area corresponding to a direction from which the moving object approaches the user's vehicle; and
enlarging a size of the area displaying the translucent blur as the moving object approaches the user's vehicle.

12. The driving support apparatus according to claim 11, wherein the display screen of the display device is comprised of a plurality of image layers, wherein
the operations further comprise causing the translucent blur to appear on one layer of the image layers as the moving object approaches the user's vehicle, in a manner that a level of the one layer is lower than or equal to a level of another layer of the image layers which displays a predetermined display item of interest.

13. The driving support apparatus according to claim 1, wherein the user's vehicle has sides, a front and a back and wherein:
the threshold lines that define at least some of the different ranges of distance arranged at a side of the user's vehicle appear in the image of nearby surroundings of the user's vehicle so as to extend along a road on which the user's vehicle is traveling; and
the operations further comprise, when the moving object moves into a one of the different ranges of distance arranged at the side of the user's vehicle or in front or back of the user's vehicle, changing a display color of a region which is defined by the extending threshold lines and includes the one or more ranges of distance.

14. The driving support apparatus according to claim 1, wherein the operations further comprise acquiring the positional relationship between said at least one moving object and the one or more different ranges of distance from the user's vehicle, using a lane width of a traffic route which is specified based on at least one of a piece of sensor information detected from a road on which the user's vehicle is traveling and a piece of existing road data associated with the road.

15. A driving support method comprising:
acquiring a positional relationship between at least one moving object and a range of distance from a user's vehicle, the range of distance being a range in which a notification of approach of the moving object to the user's vehicle is to be provided;
causing a display device to display an image of nearby surroundings of the user's vehicle including images of the user's vehicle, and
threshold lines that define the range of distance;
causing both an image indicating a driving maneuver which requires attention of a user driving the user's vehicle and a display item associated with drawing of the attention, to appear within the image of nearby surroundings of the user's vehicle; and
changing the image of nearby surroundings of the user's vehicle in accordance with the acquired positional relationship.

* * * * *